United States Patent
Haslim et al.

(10) Patent No.: US 12,216,210 B2
(45) Date of Patent: *Feb. 4, 2025

(54) MULTI-CHANNEL LIGHT DETECTION AND RANGING (LIDAR) UNIT HAVING A TELECENTRIC LENS ASSEMBLY AND SINGLE CIRCUIT BOARD FOR EMITTERS AND DETECTORS

(71) Applicant: Aurora Operations, Inc., Pittsburgh, PA (US)

(72) Inventors: James Allen Haslim, Dublin, CA (US); Michael Bryan Borden, San Francisco, CA (US); Daniel Thomas Sing, San Francisco, CA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/313,777

(22) Filed: May 8, 2023

(65) Prior Publication Data
US 2023/0324559 A1 Oct. 12, 2023

Related U.S. Application Data

(63) Continuation of application No. 17/004,712, filed on Aug. 27, 2020, now Pat. No. 11,681,048.
(Continued)

(51) Int. Cl.
*G01S 17/931* (2020.01)
*G01S 7/481* (2006.01)
(Continued)

(52) U.S. Cl.
CPC .......... *G01S 17/931* (2020.01); *G01S 7/4813* (2013.01); *G01S 7/4815* (2013.01); *G01S 7/4816* (2013.01);
(Continued)

(58) Field of Classification Search
CPC .... G01S 17/931; G01S 7/4813; G01S 7/4815; G01S 7/4816; G01S 7/4817; G01S 17/06;
(Continued)

(56) References Cited

U.S. PATENT DOCUMENTS

| 11,320,538 B2 | 5/2022 | Donovan et al. |
| 2006/0262290 A1 | 11/2006 | Yamaguchi |

(Continued)

FOREIGN PATENT DOCUMENTS

| DE | 2020/17105001 U1 | 10/2017 |
| WO | WO2020/070554 A2 | 4/2020 |

OTHER PUBLICATIONS

International Search Report and Written Opinion for Application No. PCT/US2021/043911, mailed Nov. 12, 2021, 13 pages.
U.S. Appl. No. 17/004,709, filed Aug. 27, 2020. 63 pages.

*Primary Examiner* — Hwa Andrew Lee
(74) *Attorney, Agent, or Firm* — Dority & Manning, P.A.

(57) ABSTRACT

A LIDAR unit includes a housing defining a cavity. The LIDAR unit further include a plurality of emitters disposed on a circuit board within the cavity. Each of the emitters emits a laser beam along a transmit path. The LIDAR system further includes a first telecentric lens assembly positioned within the cavity and along the transmit path such that the laser beam emitted from each of the plurality of emitters passes through the first telecentric lens assembly. The LIDAR further includes a second telecentric lens assembly positioned within the cavity and along a receive path such that a plurality of reflected laser beams entering the cavity pass through the second telecentric lens assembly. The first telecentric lens assembly and the second telecentric lens assembly each include a field flattening lens and at least one other lens.

18 Claims, 22 Drawing Sheets

Related U.S. Application Data

(60) Provisional application No. 63/059,190, filed on Jul. 31, 2020.

(51) Int. Cl.
*G01S 17/06* (2006.01)
*G01S 17/42* (2006.01)
*G05D 1/00* (2006.01)
*G05D 1/628* (2024.01)
*G05D 1/646* (2024.01)

(52) U.S. Cl.
CPC ............ *G01S 7/4817* (2013.01); *G01S 17/06* (2013.01); *G01S 17/42* (2013.01); *G05D 1/0212* (2013.01); *G05D 1/0238* (2013.01); *G05D 1/628* (2024.01); *G05D 1/646* (2024.01)

(58) Field of Classification Search
CPC ............ G01S 17/42; G01S 2013/9316; G01S 7/4814; G05D 1/0212; G05D 1/0238; G05D 2201/0213; G02B 26/123
See application file for complete search history.

(56) References Cited

U.S. PATENT DOCUMENTS

| | | |
|---|---|---|
| 2011/0149268 A1 | 6/2011 | Marchant et al. |
| 2014/0063261 A1* | 3/2014 | Betensky ............ G02B 23/145 348/158 |
| 2017/0302909 A1 | 10/2017 | Finn et al. |
| 2018/0062345 A1 | 3/2018 | Bills et al. |
| 2018/0095165 A1* | 4/2018 | Cohen ................. G02B 27/425 |
| 2018/0284284 A1 | 10/2018 | Curatu |
| 2019/0011567 A1 | 1/2019 | Pacala et al. |
| 2019/0324122 A1 | 10/2019 | Buehring |
| 2020/0174102 A1 | 6/2020 | Asselin et al. |
| 2020/0201031 A1 | 6/2020 | Holleczek et al. |
| 2021/0066893 A1 | 3/2021 | Jang et al. |
| 2022/0018963 A1 | 1/2022 | Koonath et al. |
| 2022/0082660 A1 | 3/2022 | Droz et al. |
| 2022/0120906 A1* | 4/2022 | Pacala ................. G01S 17/894 |

\* cited by examiner

MULTI-CHANNEL LIGHT DETECTION AND RANGING (LIDAR) UNIT HAVING A TELECENTRIC LENS ASSEMBLY AND SINGLE CIRCUIT BOARD FOR EMITTERS AND DETECTORS

PRIORITY CLAIM

The present application is a continuation of U.S. application Ser. No. 17/004,712 having a filing date of Aug. 27, 2020, which claims the benefit of U.S. Provisional Patent Application No. 63/059,190 having a filing date of Jul. 31, 2020. Applicant claims priority to and the benefit of each of such applications and incorporates all such applications herein by reference in their entirety.

FIELD

The present disclosure relates generally to LIDAR systems.

BACKGROUND

LIDAR systems use lasers to create three-dimensional representations of surrounding environments. A LIDAR system includes at least one emitter paired with a receiver to form a channel, though an array of channels may be used to expand the field of view of the LIDAR system. During operation, each channel emits a laser beam into the environment. The laser beam reflects off of an object within the surrounding environment, and the reflected laser beam is detected by the receiver. A single channel provides a single point of ranging information. Collectively, channels are combined to create a point cloud that corresponds to a three-dimensional representation of the surrounding environment. The LIDAR system also includes circuitry to measure the time-of-flight (that is, the elapsed time from emitting the laser beam to detecting the reflected laser beam). The time-of-flight measurement is used to determine the distance of the LIDAR system to the object.

SUMMARY

Aspects and advantages of embodiments of the present disclosure will be set forth in part in the following description, or may be learned from the description, or may be learned through practice of the embodiments.

In one example aspect, a LIDAR system is provided. The LIDAR system includes a plurality of LIDAR units. Each of the plurality of LIDAR units includes a housing defining a cavity. Each of the plurality of LIDAR units further includes a plurality of emitters disposed within the cavity. Each of the plurality of emitters is configured to emit a laser beam. The LIDAR system includes a first optic comprising a prism disk rotatable about a first axis at a first rotational speed. The prism disk is positioned relative to the plurality of LIDAR units such that a plurality of laser beams exiting each of the plurality of LIDAR units pass through the prism disk. The prism disk can be configured to refract the plurality of laser beams. The LIDAR system includes a second optic rotatable about a second axis at a second rotational speed that is faster than the first rotational speed. The second optic is positioned relative to the first optic such that each of a plurality of refracted laser beams exiting the prism disk reflect off of the second optic.

In another example aspect, an autonomous vehicle is provided. The autonomous vehicle includes a LIDAR system coupled to a vehicle body of the autonomous vehicle. The LIDAR system includes a plurality of LIDAR units. Each of the plurality of LIDAR units includes a housing defining a cavity. Each of the plurality of LIDAR units further includes a plurality of emitters disposed within the cavity. Each of the plurality of emitters is configured to emit a laser beam. The LIDAR system includes a prism disk rotatable about a first axis at a first rotational speed. The prism disk is positioned relative to the plurality of LIDAR units such that a plurality of laser beams exiting each of the plurality of LIDAR units pass through the prism disk. The prism disk is configured to refract the plurality of laser beams. The LIDAR system includes a mirror rotatable about a second axis at a second rotational speed that is faster than the first rotational speed. The mirror is positioned relative to the prism disk such that each of a plurality of refracted laser beams exiting the prism disk reflect off of the mirror.

In yet another example aspect, a LIDAR system is provided. The LIDAR system includes a first LIDAR unit and a second LIDAR unit. The first LIDAR unit and the second LIDAR unit each include a housing defining a cavity. The first LIDAR unit and the second LIDAR unit each further include a plurality of emitters disposed within the cavity. Each of the plurality of emitters is configured to emit a laser beam. The LIDAR system includes a first prism disk rotatable about a first axis at a first rotational speed. The first prism disk is positioned relative to the first LIDAR unit such that a plurality of laser beams emitted from the first LIDAR unit pass through the first prism disk. The first prism disk is configured to refract the plurality of laser beams. The LIDAR system includes a second prism disk rotatable about the first axis at the first rotational speed. The second prism disk is positioned relative to the second LIDAR unit such that a plurality of laser beams emitted from the second LIDAR unit pass through the second prism disk. The second prism disk is configured to refract the plurality of laser beams emitted from the second LIDAR unit. The LIDAR system includes a mirror rotatable about a second axis at a second rotational speed that is faster than the first rotational speed. The mirror is positioned relative to the first prism disk and the second prism disk such that a plurality of refracted laser beams exiting each of the first prism disk and the second prism disk reflect off of the mirror.

Other example aspects of the present disclosure are directed to other systems, methods, vehicles, apparatuses, tangible non-transitory computer-readable media, and devices for motion prediction and/or operation of a device including a LIDAR system having a rotatable prism disk for beam steering of lasers.

In one example aspect, a LIDAR unit is provided. The LIDAR unit includes a housing defining a cavity. The LIDAR unit includes a plurality of emitters disposed on a surface of a circuit board positioned within the cavity. Each of the plurality of emitters is configured to emit a laser beam along a transmit path. The LIDAR unit includes a first telecentric lens assembly positioned within the cavity and along the transmit path such that the laser beam emitted from each of the plurality of emitters passes through the first telecentric lens assembly. The first telecentric lens assembly includes a first field flattening lens and at least one other lens. The LIDAR unit includes a second telecentric lens assembly positioned within the cavity and along a receive path such that a plurality of reflected laser beams entering the cavity pass through the second telecentric lens assembly. The second telecentric lens assembly includes a second field flattening lens and at least one other lens. The LIDAR unit includes a plurality of detectors disposed on the surface of the circuit board. Each of the plurality of detectors is spaced apart from a corresponding emitter of the plurality of emitters. Each of the plurality of detectors is configured to detect one or more of the plurality of reflected laser beams.

In another example aspect, an autonomous vehicle is provided. The autonomous vehicle includes one or more LIDAR units coupled to a vehicle body of the autonomous vehicle. The one or more LIDAR units include a housing defining a cavity. The one or more LIDAR units further include a plurality of emitters disposed on a surface of a circuit board positioned within the cavity. Each of the plurality of emitters includes a laser diode configured to emit a laser beam such that the laser beam is substantially perpendicular to the circuit board. Each of the plurality of emitters further include a collimation lens positioned relative to the laser diode such that the laser beam emitted from the laser diode reflects off of the collimation lens and along a transmit path. The one or more LIDAR units include a first telecentric lens assembly positioned within the cavity and along the transmit path such that the laser beam emitted from each of the plurality of emitters passes through the first telecentric lens assembly. The first telecentric lens assembly includes a first field flattening lens and at least one other lens. The one or more LIDAR units include a second telecentric lens assembly positioned within the cavity and along a receive path such that a plurality of reflected laser beams entering the cavity pass through the second telecentric lens assembly. The second telecentric lens assembly includes a second field flattening lens and at least one other lens. The one or more LIDAR units include a plurality of detectors disposed on the surface of the circuit board. Each of the plurality of detectors is spaced apart from a corresponding emitter of the plurality of emitters. Each of the plurality of detectors is configured to detect one or more of the plurality of reflected laser beams.

In yet another example aspect, a computing system is provided. The computing system includes one or more processors. The computing system further includes one or more tangible, non-transitory, computer readable media that collectively store instructions that, when executed by the one or more processors, cause the computing system to perform operations. The operations include obtaining sensor data via a LIDAR system. The LIDAR system includes a LIDAR unit. The LIDAR unit includes a housing defining a cavity. The LIDAR unit includes one or more emitters positioned within the cavity. The one or more emitters are configured to emit one or more laser beams along a transmit path. The LIDAR unit includes a first telecentric lens assembly along the transmit path and a second telecentric lens assembly along a receive path. The LIDAR unit includes one or more detectors configured to detect one or more reflected laser beams entering the cavity. The operations further include determining an object within a field of view of the LIDAR system based at least in part on the sensor data. The operations even further include determining one or more future locations of the object and determining an action for an autonomous vehicle based at least in part on the one or more future locations of the object Other example aspects of the present disclosure are directed to other systems, methods, vehicles, apparatuses, tangible non-transitory computer-readable media, and devices for motion prediction and/or operation of a device including a LIDAR system having a telecentric lens assembly and single circuit board for both emitters and detectors.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
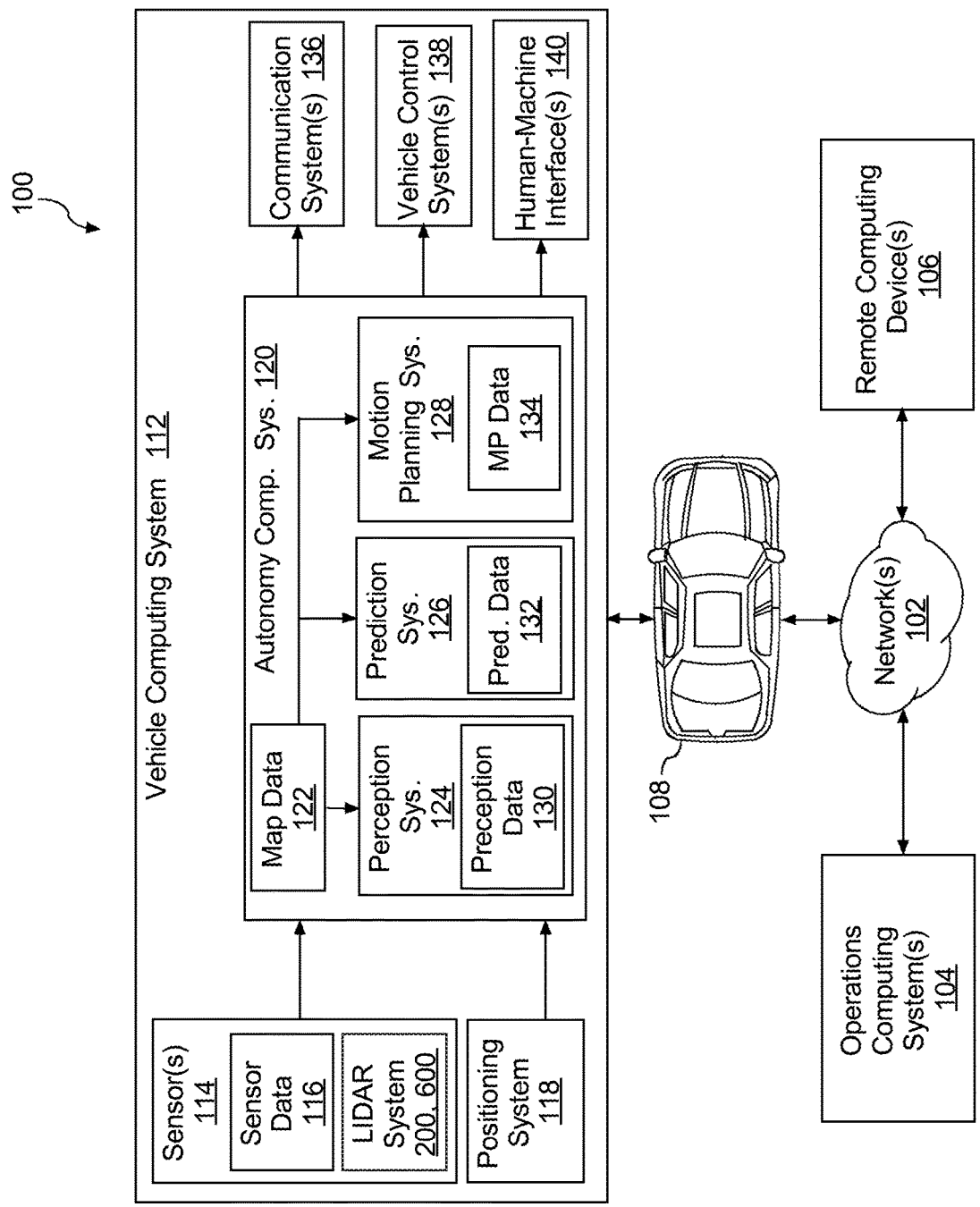
FIG. 1 depicts a block diagram of an example system for controlling the computational functions of an autonomous vehicle according to example embodiments of the present disclosure.

Example aspects of the present disclosure are directed to a light detection and ranging (LIDAR) system. The LIDAR system can include a plurality of LIDAR units. Each of the plurality of LIDAR units can include a housing defining a cavity. Each of the plurality of LIDAR units can further include a plurality of emitters disposed on a circuit board positioned within the cavity. Each of the plurality of emitters can be configured to emit a laser beam. In this manner, a plurality of laser beams can be emitted from the housing of each of the plurality of LIDAR units. The plurality of laser beams are spaced apart from one another by a first angular distance (e.g., greater than 4 degrees).

The LIDAR system according to example aspects of the present disclosure can include a first optic. The first optic can include a prism disk rotatable about a first axis at a first rotational speed (e.g., from 500 revolutions per minute to 700 revolutions per minute). The prism disk can be positioned relative to the plurality of LIDAR units such that the plurality of laser beams pass through the prism disk. Furthermore, the prism disk can refract the plurality of laser beams to reduce a spacing (e.g., angular distance) between the plurality of laser beams to improve the resolution of the LIDAR system. More specifically, the prism disk can refract the plurality of laser beams such that a plurality of refracted laser beams exiting the prism disk are spaced apart from one another by a second angular distance (e.g., less than 2 degrees, less than 1 degree) that is less than the first angular distance. Construction of the prism disk will now be discussed in more detail.

The prism disk can include a plurality of wedges. For instance, in some implementations, the prism disk can include a total of six wedges (e.g., first wedge, second wedge, third wedge, fourth wedge, fifth wedge and sixth wedge). In alternative implementations, the prism disk can include more or fewer wedges. Each of the plurality of wedges of the prism disk can define a different wedge angle. For instance, a first wedge angle associated with a first wedge of the plurality of wedges can be different than a second wedge angle associated with a second wedge of the plurality of wedges. The wedge angle for each of the plurality of wedges can range from −5 degrees relative to an axis (e.g., radial axis) of the prism disk to 5 degrees relative to the axis of the prism disk.

In some implementations, the plurality of laser beams exiting a first LIDAR unit of the plurality of LIDAR units and the plurality of laser beams exiting a second LIDAR unit of the plurality of LIDAR units can pass through a first portion of the prism disk. Conversely, the plurality of laser beams exiting a third LIDAR unit of the plurality of LIDAR units and the plurality of laser beams exiting a fourth LIDAR unit of the plurality of LIDAR units can pass through a second portion of the prism disk. The second portion of the prism disk can be different than the first portion of the prism disk. For instance, the first portion can include a first wedge, a second wedge, and a third wedge. Conversely, the second portion can include the fourth wedge, the fifth wedge, and the sixth wedge. Furthermore, in such implementations, each of the wedges (e.g., first wedge, second wedge, third wedge, fourth wedge, fifth wedge, sixth wedge) can be substantially the same size.

In some implementations, the housing of each of the plurality of LIDAR units can be tilted relative to the first axis by about 45 degrees. For instance, the housing of a first LIDAR unit and the housing of a second LIDAR unit can each be tilted upward relative to the first axis. Conversely, the housing of a third LIDAR unit and the housing of a fourth LIDAR unit can each be tilted downward relative to the first axis.

The LIDAR system according to example aspects of the present disclosure can include a second optic positioned relative to the first optic such that the plurality of refracted laser beams reflect off of the second optic. In some implementations, the second optic can be a multi-sided mirror (e.g., The second optic can be rotatable about a second axis at a second rotational speed that is faster than the first rotational speed. For instance, in some implementations, the second rotational speed can range from 3,300 revolutions per minute to 3,900 revolutions per minute. The second axis can, in some implementations, be substantially perpendicular (e.g., less than a 15 degree difference, less than a 10 degree difference, less than a 5 degree difference, less than a 1 degree difference, etc.) to the first axis.

A field of regard of the second optic can be wider than a field of regard of the first optic. For instance, in some implementations, the field of regard of the second optic can be about 180 degrees, whereas the field of regard of the first optic can be about 80 degrees. In this manner, the second optic can widen a field of regard of the LIDAR system such that the LIDAR system can scan a larger area without needing to physically move one or more of the LIDAR units. Construction of the LIDAR units of the LIDAR system will now be discussed in more detail.

Example aspects of the present disclosure are directed to a LIDAR unit. The LIDAR unit can include a housing defining a cavity. The LIDAR unit can further include a plurality of emitters disposed on a surface of a circuit board positioned within the cavity. Each of the plurality of emitters can be configured to emit a laser beam along a transmit path that is substantially perpendicular to the surface of the circuit board.

Each of the plurality of emitters can include a laser diode configured to emit the laser beam. In some implementations, the laser diode can be configured to emit the laser beam such that the laser beam is substantially parallel (e.g., less than a 15 degree difference, less than a 10 degree difference, less than a 5 degree difference, less than a 1 degree difference, etc.) to the surface of the circuit board. In such implementations, each of the plurality of emitters can include a collimation lens. The collimation lens can be positioned relative to the laser diode such that the laser beam reflects off of a surface of the collimation lens. More specifically, the laser beam can reflect off of the surface such that the reflected laser beam is substantially perpendicular to the circuit board. In this manner, the reflected laser beam can be directed along the transmit path.

The LIDAR unit can include a first telecentric lens assembly and a second telecentric lens assembly. The first telecentric lens assembly can be positioned within the cavity of the housing and along the transmit path. In this manner, the laser beam emitted from each of the plurality of emitters can pass through the first telecentric lens assembly before exiting the cavity. Furthermore, the second telecentric lens assembly can be positioned within the cavity of the housing and along a receive path. In this manner, a plurality of reflected laser beams entering the cavity from an outside environment can pass through the second telecentric lens assembly.

It should be understood that the receive path along which the second telecentric lens assembly is positioned is different than the transmit path along which the first telecentric lens assembly is positioned. For instance, the receive path can be located at a lower portion of the cavity, whereas the transmit path can be located at an upper portion of the cavity. Furthermore, in some implementations, the housing of the LIDAR unit can include a partition wall dividing the cavity into the upper portion and the lower portion.

The first telecentric lens assembly and the second telecentric lens assembly can each include multiple lenses. More specifically, the first telecentric lens assembly and the second telecentric lens assembly can each include at least a first lens (e.g., field flattening lens) and a second lens (e.g., refractive lens). The first lens (e.g., field flattening lens) can be positioned between the circuit board and the second lens (e.g., refractive lens). Furthermore, the first telecentric lens assembly can eliminate the need for the plurality of emitters to be disposed on a curved surface. In this manner, the surface of the circuit board on which the plurality of emitters are disposed can be substantially flat (that is, not curved). This can reduce complexity in manufacturing and assembly of the circuit board.

Furthermore, the field flattening lens of the first telecentric lens assembly disposed along the transmit path can be thinner than the field flattening lens of the field flattening lens of the second telecentric lens assembly disposed along the receive path. In some implementations, the field flattening lens of the first telecentric lens assembly can have a thickness of about 3 millimeters, whereas the field flattening lens of the second telecentric lens assembly can have a thickness of about 4 millimeters.

The LIDAR unit can include a plurality of detectors. Each of the plurality of detectors can be configured to detect one or more of the plurality of reflected laser beams entering the cavity. Furthermore, since the LIDAR unit includes the second telecentric lens assembly disposed along the receive path, the plurality of detectors need not be disposed on a curved surface. As such, the plurality of detectors can be disposed on the same circuit board on which the plurality of emitters are disposed. More specifically, the plurality of emitters and the plurality of detectors can be disposed on the same surface of the circuit board.

Each of the plurality of detectors can be spaced apart from a corresponding emitter of the plurality of emitters by a distance. For instance, in some implementations, each of the plurality of detectors can be spaced from the corresponding emitter by a distance of about 4 millimeters. As used herein, the term "about" refers to a range of values with 20% of a stated numerical value. In some implementations, each of the plurality of detectors can include an avalanche photodiode. In some implementations, the LIDAR unit can include an optical filter.

The optical filter can be positioned along the receive path. More specifically, the optical filter can be positioned between the telecentric lens of the receive optics and the plurality of detectors. In this manner, the optical filter can have a narrow acceptance angle (e.g., about 2 degrees), because the plurality of reflected laser beams exiting the telecentric lens are substantially perpendicular to a surface of the optical filter. It should be understood that the optical filter can include any type of filter. For instance, in some implementations, the optical filter can be a bandpass filter.

In some implementations, the LIDAR system according to the present disclosure can be implemented onboard an autonomous vehicle (e.g., ground-based vehicle, aerial vehicle, etc.). The autonomous vehicle can include various systems and devices configured to control the operation of the autonomous vehicle. For example, the autonomous vehicle can include an onboard vehicle computing system (e.g., located on or within the autonomous vehicle) that is configured to operate the autonomous vehicle. The onboard vehicle computing system can obtain sensor data from sensor(s) onboard the vehicle (e.g., cameras, LIDAR, RADAR, etc.), attempt to comprehend the vehicle's surrounding environment by performing various processing techniques on the sensor data, and generate an appropriate motion plan through the vehicle's surrounding environment. This can include, for example, detecting of object(s) (e.g., pedestrians, vehicles, bicycles/bicyclists, etc.) within the vehicle's surrounding environment, predicting the future motion trajectory of those objects, and planning the vehicle's motion to avoid interference with the object(s). Moreover, the autonomous vehicle can include a communications system that can allow the autonomous vehicle to communicate with a computing system that is remote from the autonomous vehicle such as, for example, that of a service entity.

An autonomous vehicle can perform vehicle services for one or more service entities. A service entity can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of vehicle service(s) to one or more users. As an example, a service entity can offer vehicle service(s) to users via a software application (e.g., on a user computing device), via a website, and/or via other types of interfaces that allow a user to request a vehicle service. The vehicle services can include user transportation services (e.g., by which the vehicle transports user(s) from one location to another), delivery services (e.g., by which a vehicle delivers item(s) to a requested destination location), courier services (e.g., by which a vehicle retrieves item(s) from a requested origin location and delivers the item to a requested destination location), and/or other types of services.

An operations computing system of the service entity can help to coordinate the performance of vehicle services by autonomous vehicles. For instance, the operations computing system can include a service platform. The service platform can include a plurality of back-end services and front-end interfaces, which are accessible via one or more APIs. For example, an autonomous vehicle and/or another computing system that is remote from the autonomous vehicle can communicate/access the service platform (and its backend services) by calling the one or more APIs. Such components can facilitate secure, bidirectional communications between autonomous vehicles and/or the service entity's operations system (e.g., including a data center, etc.).

The service platform can allow an autonomous vehicle to obtain data from and/or communicate data to the operations computing system. By way of example, a user can provide (e.g., via a user device) a request for a vehicle service to the operations computing system associated with the service entity. The request can indicate the type of vehicle service that the user desires (e.g., a user transportation service, a delivery service, etc.), one or more locations (e.g., an origin, destination, etc.), timing constraints (e.g., pick-up time, drop-off time, deadlines, etc.), a number of user(s) and/or items to be transported in the vehicle, other service parameters (e.g., a need for handicap access, handle with care instructions, etc.), and/or other information. The operations computing system of the service entity can process the request and identify one or more autonomous vehicles that may be able to perform the requested vehicle services for the user. For instance, the operations computing system can identify which autonomous vehicle(s) are online with the service entity (e.g., available for a vehicle service assignment, addressing a vehicle service assignment, etc.). An autonomous vehicle can go online with a service entity by, for example, connecting with the service entity's operations computing system (e.g., the service platform) so that the vehicle computing system can communicate with the operations computing system via a network. Once online, the operations computing system can communicate a vehicle service assignment indicative of the requested vehicle services and/or other data to the autonomous vehicle.

The autonomous vehicle can be configured to operate in one or more modes including, for example, a fully autonomous operating mode, a semi-autonomous operating mode, and a manual operating mode. The fully autonomous (e.g., self-driving) operating mode can be one in which the autonomous vehicle can provide driving and navigational operation with minimal and/or no interaction from a human driver present in the autonomous vehicle. The semi-autonomous operating mode can be one in which the vehicle can operate with some interaction from a human driver present in the vehicle. The manual operating mode can be one in which a human driver present in the autonomous vehicle manually controls (e.g., acceleration, braking, steering) the autonomous vehicle via one or more input devices (e.g., steering device) of the autonomous vehicle.

The LIDAR system can be implemented on the autonomous vehicle to obtain data associated with the surrounding environment in which the autonomous vehicle is operating (e.g., while online with service entity, performing a vehicle service, etc.). In some implementations, the LIDAR system can be coupled to a vehicle body (e.g., frame, panels, etc.) of the autonomous vehicle. For instance, the LIDAR system can be coupled to a bumper of the autonomous vehicle. However, it should be understood that the LIDAR system can be mounted to the autonomous vehicle at any suitable location.

An autonomous vehicle can utilize the described LIDAR system to account for object(s) within a field-of view of the LIDAR system. For instance, an autonomous vehicle (e.g., its onboard computing system) can obtain sensor data via the LIDAR system. The sensor data can be indicative of an object within the field of view of the LIDAR system. The autonomous vehicle can determine perception data for the object within the field of view of the LIDAR system based at least in part on the sensor data. The perception data can describe, for example, an estimate of the object's current and/or past: location and/or position; speed; velocity; acceleration; heading; orientation; size/footprint (e.g., as represented by a bounding shape); class (e.g., pedestrian class vs. vehicle class vs. bicycle class); and/or other state information. The autonomous vehicle can determine future location(s) of the object based at least in part on the perception data. For example, the autonomous vehicle can generate a trajectory (e.g., including one or more waypoints) that is indicative of a predicted future motion of the object, given the object's heading, velocity, type, etc. over current/previous timestep(s). The autonomous vehicle can determine an action for the autonomous vehicle based at least in part on the detected object and/or the future location(s) of the object within the field of view of the LIDAR system. For example, the autonomous vehicle can generate a motion plan that includes a vehicle trajectory by which the vehicle can travel to avoid interfering/colliding with the object. In another example, the autonomous vehicle can determine that the object is a user that intends to enter the autonomous vehicle (e.g., for a human transportation service) and/or that intends place an item in the autonomous vehicle (e.g., for a courier/delivery service). The autonomous vehicle can unlock a door, trunk, etc. to allow the user to enter and/or place an item within the vehicle. The autonomous vehicle can communicate one or more control signals (e.g., to a motion control system, door control system, etc.) to initiate the determined actions.

A LIDAR system according to example embodiments of the present disclosure can provide numerous technical effects and benefits. For instance, the prism disk of the LIDAR system can refract the plurality of laser beams exiting each of the plurality of LIDAR units such that the spacing (e.g., angular distance) between the plurality of refracted laser beams exiting the first optic is less than the spacing (e.g., angular distance) between the plurality of laser beams exiting each of the plurality of LIDAR units. In this manner, the resolution of the LIDAR system according to the present disclosure can be improved. Furthermore, the second optic of the LIDAR system can be positioned such that the plurality of refracted laser beams exiting the first optic reflect off of the second optic and widen the field of regard of the LIDAR system. In this manner, the LIDAR system according to the present disclosure can scan a larger area without needing to manipulate (e.g., move) one or more LIDAR units of the system.

Additionally, a LIDAR unit according to the present disclosure can provide numerous technical effects and benefits. For instance, the transmit optics and receive optics of the LIDAR unit can each include a telecentric lens. The telecentric lens allows the emitters and detectors of the LIDAR unit to be disposed on the same circuit board. More specifically, the telecentric lens allows the emitters and detectors of the LIDAR unit to be disposed on the same surface of the circuit board. Furthermore, since the transmit optics and the receive optics each include the telecentric lens, the surface of the circuit board can be substantially flat. In this manner, the circuit board can be more easily manufactured. Moreover, the telecentric can allow for the use of an optical filter having a narrow acceptance angle (e.g., about 2 degrees) while still maintaining a wide field-of view out of the cavity of the LIDAR unit.

Referring now to the FIGS., FIG. 1 depicts a system 100 that includes a communications network 102; an operations computing system 104; one or more remote computing devices 106; a vehicle 108; a vehicle computing system 112; one or more sensors 114; sensor data 116; a positioning system 118; an autonomy computing system 120; map data 122; a perception system 124; a prediction system 126; a motion planning system 128; perception data 130; prediction data 132; motion plan data 134; a communication system 136; a vehicle control system 138; and a human-machine interface 140.

The operations computing system 104 can be associated with a service provider that can provide one or more vehicle services to a plurality of users via a fleet of vehicles that includes, for example, the vehicle 108. The vehicle services can include transportation services (e.g., rideshare services), courier services, delivery services, and/or other types of services.

The operations computing system 104 can include multiple components for performing various operations and functions. For example, the operations computing system 104 can be configured to monitor and communicate with the vehicle 108 and/or its users to coordinate a vehicle service provided by the vehicle 108. To do so, the operations computing system 104 can communicate with the one or more remote computing devices 106 and/or the vehicle 108 via one or more communications networks including the communications network 102. The communications network 102 can send and/or receive signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 102 can include a local area network (e.g. intranet), wide area network (e.g. the Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 108.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 108 including sending and/or receiving data or signals to and from the vehicle 108, monitoring the state of the vehicle 108, and/or controlling the vehicle 108. The one or more remote computing devices 106 can communicate (e.g., exchange data and/or signals) with one or more devices including the operations computing system 104 and the vehicle 108 via the communications network 102. For example, the one or more remote computing devices 106 can request the location of the vehicle 108 or a state of one or more objects detected by the one or more sensors 114 of the vehicle 108, via the communications network 102.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 108 including a location (e.g., a latitude and longitude), a velocity, an acceleration, a trajectory, a heading, and/or a path of the vehicle 108 based, at least in part, on signals or data exchanged with the vehicle 108. In some implementations, the operations computing system 104 can include the one or more remote computing devices 106.

The vehicle 108 can be a ground-based vehicle (e.g., an automobile, a motorcycle, a train, a tram, a bus, a truck, a tracked vehicle, a light electric vehicle, a moped, a scooter, and/or an electric bicycle), an aircraft (e.g., airplane or helicopter), a boat, a submersible vehicle (e.g., a submarine), an amphibious vehicle, a hovercraft, a robotic device (e.g. a bipedal, wheeled, or quadrupedal robotic device), and/or any other type of vehicle. The vehicle 108 can be an autonomous vehicle that can perform various actions including driving, navigating, and/or operating, with minimal and/or no interaction from a human driver. The vehicle 108 can be configured to operate in one or more modes including, for example, a fully autonomous operational mode, a semi-autonomous operational mode, a manual operating mode, a park mode, and/or a sleep mode. A fully autonomous (e.g., self-driving) operational mode can be one in which the vehicle 108 can provide driving and navigational operation with minimal and/or no interaction from a human driver present in the vehicle. A semi-autonomous operational mode can be one in which the vehicle 108 can operate with some interaction from a human driver present in the vehicle. A manual operating mode can be one in which a human driver present in the autonomous vehicle manually controls (e.g., acceleration, braking, steering) the vehicle 108 via one or more vehicle control devices (e.g., steering device) of the vehicle 108. Park and/or sleep modes can be used between operational modes while the vehicle 108 performs various actions including waiting to provide a subsequent vehicle service, and/or recharging between operational modes.

An indication, record, and/or other data indicative of the state of the vehicle 108, the state of one or more passengers of the vehicle 108, and/or the state of an environment external to the vehicle 108 including one or more objects (e.g., the physical dimensions, velocity, acceleration, heading, location, and/or appearance of the one or more objects) can be stored locally in one or more memory devices of the vehicle 108. Furthermore, as discussed above, the vehicle 108 can provide data indicative of the state of the one or more objects (e.g., physical dimensions, velocity, acceleration, heading, location, and/or appearance of the one or more objects) within a predefined distance of the vehicle 108 to the operations computing system 104 and/or the remote computing devices 106, which can store an indication, record, and/or other data indicative of the state of the one or more objects within a predefined distance of the vehicle 108 in one or more memory devices associated with the operations computing system 104 and/or the one or more remote computing devices 106 (e.g., remote from the vehicle).

The vehicle 108 can include and/or be associated with the vehicle computing system 112. The vehicle computing system 112 can include one or more computing devices located onboard the vehicle 108. For example, the one or more computing devices of the vehicle computing system 112 can be located on and/or within the vehicle 108. The one or more computing devices of the vehicle computing system 112 can include various components for performing various operations and functions. For instance, the one or more computing devices of the vehicle computing system 112 can include one or more processors and one or more tangible non-transitory, computer readable media (e.g., memory devices). The one or more tangible non-transitory, computer readable media can store instructions that when executed by the one or more processors cause the vehicle 108 (e.g., its computing system, one or more processors, and other devices in the vehicle 108) to perform operations and/or functions, including those described herein for accessing state data including information associated with one or more respective locations and/or characteristics of one or more objects over a plurality of time intervals and/or determining, based at least in part on the state data and a machine-learned prediction generator model, one or more predicted trajectories of the one or more objects at one or more subsequent time intervals following the plurality of time intervals. Furthermore, the vehicle computing system 112 can perform one or more operations associated with the control, exchange of data, and/or operation of various devices and systems including robotic devices and/or other computing devices.

As depicted in FIG. 1, the vehicle computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects proximate to the vehicle 108 (e.g., within range or a field of view of one or more of the one or more sensors 114). The one or more sensors 114 can include one or more Light Detection and Ranging (LiDAR) systems, one or more Radio Detection and Ranging (RADAR) systems, one or more cameras (e.g., visible spectrum cameras and/or infrared cameras), one or more sonar systems, one or more motion sensors, and/or other types of image capture devices and/or sensors. The sensor data 116 can include image data, radar data, LiDAR data, sonar data, and/or other data acquired by the one or more sensors 114. The one or more objects can include, for example, pedestrians, vehicles, bicycles, buildings, roads, foliage, utility structures, bodies of water, and/or other objects. The one or more objects can be located on or around (e.g., in the area surrounding the vehicle 108) various parts of the vehicle 108 including a front side, rear side, left side, right side, top, or bottom of the vehicle 108. The sensor data 116 can be indicative of a location of the one or more objects within the surrounding environment of the vehicle 108 at one or more times. For example, sensor data 116 can be indicative of one or more LiDAR point clouds associated with the one or more objects within the surrounding environment. The one or more sensors 114 can provide the sensor data 116 to the autonomy computing system 120.

In addition to the sensor data 116, the autonomy computing system 120 can retrieve or otherwise obtain data, including the map data 122. The map data 122 can provide detailed information about the surrounding environment of the vehicle 108. For example, the map data 122 can provide information regarding: the identity and/or location of different roadways, road segments, buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The positioning system 118 can determine a current position of the vehicle 108. The positioning system 118 can be any device or circuitry for analyzing the position of the vehicle 108. For example, the positioning system 118 can determine a position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 108 can be used by various systems of the vehicle computing system 112 and/or provided to one or more remote computing devices (e.g., the operations computing system 104 and/or the remote computing devices 106). For example, the map data 122 can provide the vehicle 108 relative positions of the surrounding environment of the vehicle 108. The vehicle 108 can identify its position within the surrounding environment (e.g., across six axes) based at least in part on the data described herein. For example, the vehicle 108 can process the sensor data 116 (e.g., LiDAR data, camera data) to match it to a map of the surrounding environment to get a determination of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 108 and determine a motion plan for controlling the motion of the vehicle 108 accordingly. One or more of these systems can be combined into a single system performing the functions thereof and/or share computing resources. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment, including for example, a motion plan that navigates the vehicle 108 around the current and/or predicted locations of one or more objects detected by the one or more sensors 114. The autonomy computing system 120 can control the one or more vehicle control systems 138 to operate the vehicle 108 according to the motion plan.

The autonomy computing system 120 can identify one or more objects that are proximate to the vehicle 108 based at least in part on the sensor data 116 and/or the map data 122. For example, the perception system 124 can obtain perception data 130 descriptive of a current and/or past state of an object that is proximate to the vehicle 108. The perception data 130 for each object can describe, for example, an estimate of the object's current and/or past: location and/or position; speed; velocity; acceleration; heading; orientation; size/footprint (e.g., as represented by a bounding shape); class (e.g., pedestrian class vs. vehicle class vs. bicycle class), and/or other state information. The perception system 124 can provide the perception data 130 to the prediction system 126 (e.g., for predicting the movement of an object).

The prediction system 126 can generate prediction data 132 associated with each of the respective one or more objects proximate to the vehicle 108. The prediction data 132 can be indicative of one or more predicted future locations of each respective object. The prediction data 132 can be indicative of a predicted path (e.g., predicted trajectory) of at least one object within the surrounding environment of the vehicle 108. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

In some implementations, the prediction system 126 can utilize one or more machine-learned models. For example, the prediction system 126 can determine prediction data 132 including a predicted trajectory (e.g., a predicted path, one or more predicted future locations, etc.) along which a respective object is predicted to travel over time based on one or more machine-learned models. By way of example, the prediction system 126 can generate such predictions by including, employing, and/or otherwise leveraging a machine-learned prediction model. For example, the prediction system 126 can receive perception data 130 (e.g., from the perception system 124) associated with one or more objects within the surrounding environment of the vehicle 108. The prediction system 126 can input the perception data 130 (e.g., BEV image, LIDAR data, etc.) into the machine-learned prediction model to determine trajectories of the one or more objects based on the perception data 130 associated with each object. For example, the machine-learned prediction model can be previously trained to output a future trajectory (e.g., a future path, one or more future geographic locations, etc.) of an object within a surrounding environment of the vehicle 108. In this manner, the prediction system 126 can determine the future trajectory of the object within the surrounding environment of the vehicle 108 based, at least in part, on the machine-learned prediction generator model.

As discussed above, the machine-learned prediction model can be previously trained via one or more machine-learning techniques. In some implementations, the machine-learned prediction model can be previously trained by one or more devices (e.g., training computing system, operations computing system 104, one or more remote computing devices 106, etc.) remote from the vehicle 108.

The motion planning system 128 can determine a motion plan and generate motion plan data 134 for the vehicle 108 based at least in part on the prediction data 132 (and/or other data). The motion plan data 134 can include vehicle actions with respect to the objects proximate to the vehicle 108 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 108 can perform a certain action (e.g., pass an object) without increasing the potential risk to the vehicle 108 and/or violating any traffic laws (e.g., speed limits, lane boundaries, signage). The motion plan data 134 can include a planned trajectory, velocity, acceleration, and/or other actions of the vehicle 108.

The motion planning system 128 can provide the motion plan data 134 with data indicative of the vehicle actions, a planned trajectory, and/or other operating parameters to the vehicle control systems 138 to implement the motion plan data 134 for the vehicle 108. For instance, the vehicle 108 can include a mobility controller configured to translate the motion plan data 134 into instructions. In some implementations, the mobility controller can translate determined motion plan data 134 into instructions for controlling the vehicle 108 including adjusting the steering of the vehicle 108 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections). In some implementations, the communications system 136 can allow communication among one or more of the system on-board the vehicle 108. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop and/or smartphone) can be viewable by a user of the vehicle 108 that is located in the front of the vehicle 108 (e.g., driver's seat, front passenger seat). Additionally, or alternatively, a display device can be viewable by a user of the vehicle 108 that is located in the rear of the vehicle 108 (e.g., a back passenger seat). For example, the autonomy computing system 120 can provide one or more outputs including a graphical display of the location of the vehicle 108 on a map of a geographical area within one kilometer of the vehicle 108 including the locations of objects around the vehicle 108. A passenger of the vehicle 108 can interact with the one or more human-machine interfaces 140 by touching a touchscreen display device associated with the one or more human-machine interfaces.

In some implementations, the vehicle computing system 112 can perform one or more operations including activating, based at least in part on one or more signals or data (e.g., the sensor data 116, the map data 122, the perception data 130, the prediction data 132, and/or the motion plan data 134) one or more vehicle systems associated with operation of the vehicle 108. For example, the vehicle computing system 112 can send one or more control signals to activate one or more vehicle systems that can be used to control and/or direct the travel path of the vehicle 108 through an environment.

By way of further example, the vehicle computing system 112 can activate one or more vehicle systems including: the communications system 136 that can send and/or receive signals and/or data with other vehicle systems, other vehicles, or remote computing devices (e.g., remote server devices); one or more lighting systems (e.g., one or more headlights, hazard lights, and/or vehicle compartment lights); one or more vehicle safety systems (e.g., one or more seatbelt and/or airbag systems); one or more notification systems that can generate one or more notifications for passengers of the vehicle 108 (e.g., auditory and/or visual messages about the state or predicted state of objects external to the vehicle 108); braking systems; propulsion systems that can be used to change the acceleration and/or velocity of the vehicle which can include one or more vehicle motor or engine systems (e.g., an engine and/or motor used by the vehicle 108 for locomotion); and/or steering systems that can change the path, course, and/or direction of travel of the vehicle 108.

Figure 2:
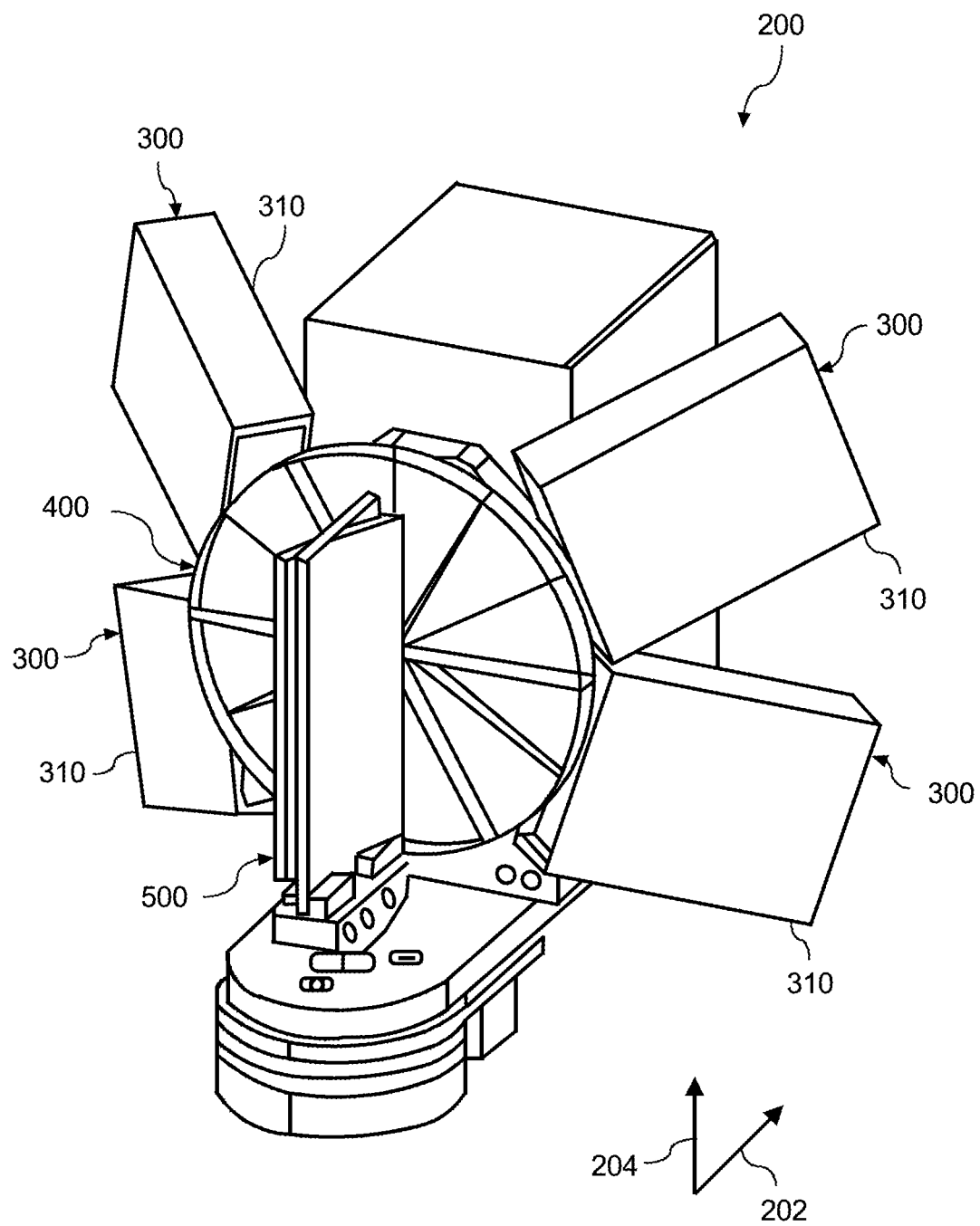
FIG. 2 depicts a LIDAR system according to example embodiments of the present disclosure.
Figure 3:
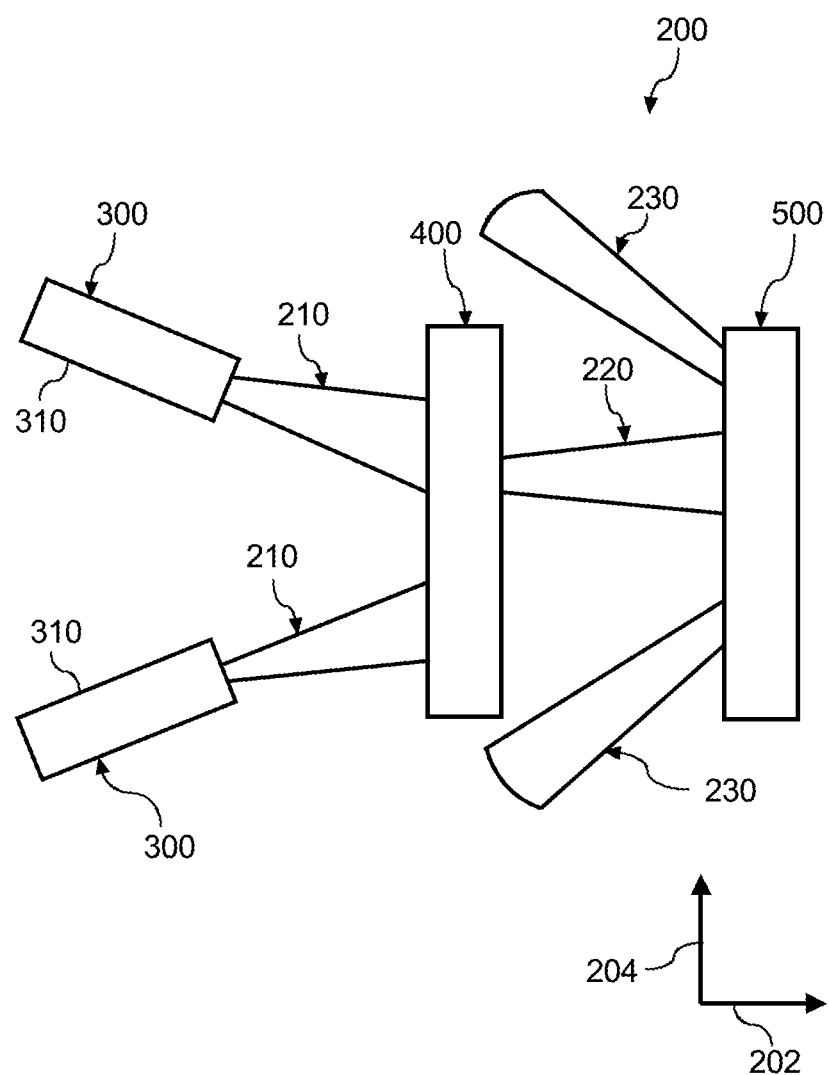
FIG. 3 depicts a cross-sectional view of a LIDAR system according to example embodiments of the present disclosure.

Referring now to FIGS. 2 and 3, a LIDAR system 200 is provided according to example embodiments of the present disclosure. It should be understood that the LIDAR system 200 can be included as part of the sensors 114 discussed above with reference to FIG. 1. As shown, the LIDAR system 200 can include a plurality of LIDAR units 300. For instance, in some implementations, the LIDAR system 200 can include four LIDAR units 300. In alternative implementations, the LIDAR system 200 can include more or fewer LIDAR units 300. Each of the plurality of LIDAR units 300 can include a housing 310 defining a cavity (not shown). Furthermore, each of the plurality of LIDAR units 300 can include a plurality of emitters (not shown) positioned within the cavity. It should be understood that each of the plurality of emitters can be configured to emit a laser beam. In this manner, a plurality of laser beams 210 can be emitted from the housing 310 of each of the plurality of LIDAR units 300.

As shown, the LIDAR system 200 can include a first optic 400. The first optic 400 can be rotatable about a first axis 202 at a first rotational speed. In some implementations, the first rotational speed can range from 500 revolutions per minute to 700 revolutions per minute. The first optic 400 can be positioned relative to the plurality of LIDAR units 300 such that the plurality of laser beams 210 exiting the housing 310 of each of the plurality of LIDAR units 300 pass through the first optic 400. Furthermore, the first optic 400 can refract the plurality of laser beams 210 such that the plurality of laser beams 210 exit the first optic 400 as a plurality of refracted laser beams 220.

The LIDAR system 200 can further include a second optic 500. The second optic 500 can be rotatable about a second axis 204 at a second rotational speed. The second axis 204 can be substantially perpendicular (e.g., less than a 15 degree difference, less than a 10 degree difference, less than a 5 degree difference, less than a 1 degree difference, etc.) to the first axis 202. Furthermore, the second rotational speed can be faster than the first rotational speed. For instance, in some implementations, the second rotational speed can range from 3,300 revolutions per minute to 3,900 revolutions per minute.

The second optic 500 can be positioned within a path of the plurality of refracted laser beams 220 exiting the first optic 400. Furthermore, the second optic 500 can include a mirror. In this manner, the plurality of refracted laser beams 220 can reflect off the second optic 500 as a plurality of reflected laser beams 230. In some implementations, the second optic 500 can include a multi-sided mirror (e.g., double-sided mirror, triple-sided mirror, etc.).

A field of regard of the second optic 500 can be wider than a field of regard of the first optic 400. For instance, in some implementations, the field of regard of the second optic 500 can be about 180 degrees, whereas the field of regard of the first optic 400 can be about 80 degrees. In this manner, the second optic 500 can widen a field of regard of the LIDAR system 200 such that the LIDAR system 200 can scan a larger area without needing to physically move one or more of the LIDAR units 300.

Figure 4:
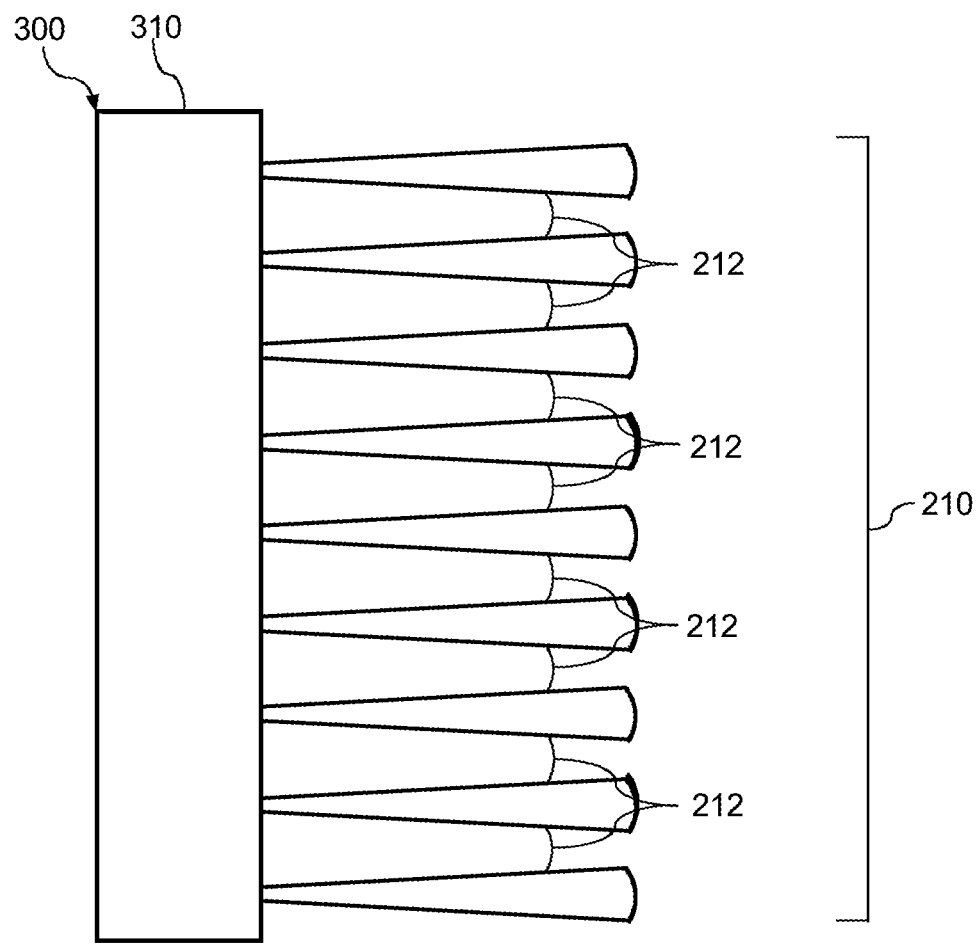
FIG. 4 depicts spacing between a plurality of laser beams exiting a LIDAR unit according to example embodiments of the present disclosure.
Figure 5:
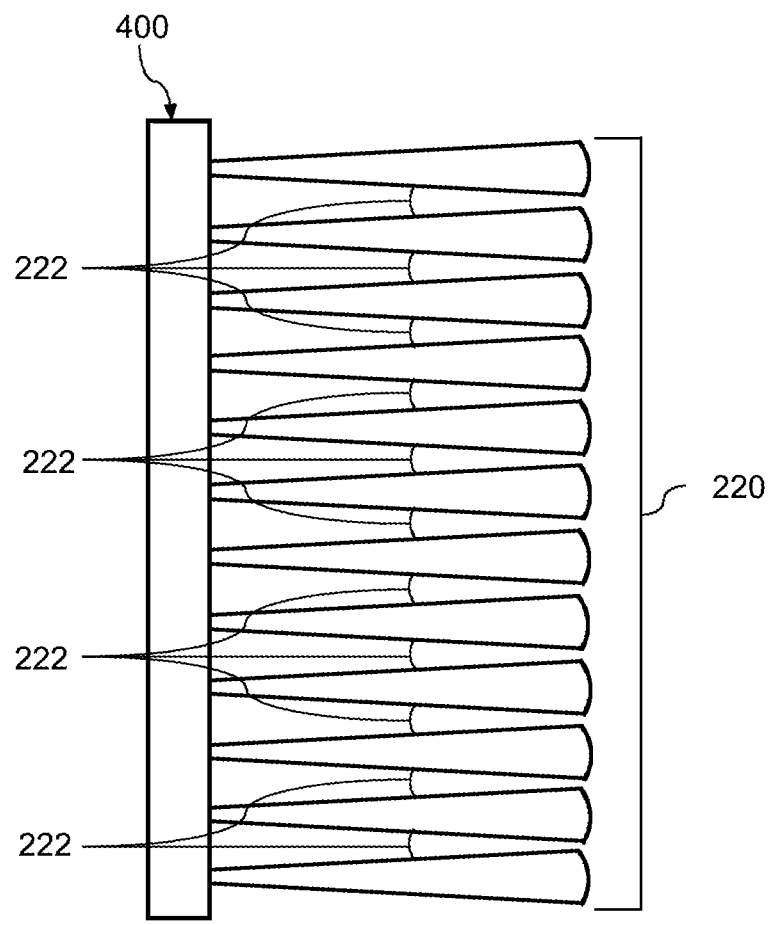
FIG. 5 depicts spacing between a plurality of laser beams exiting a first optic of a LIDAR system according to example embodiments of the present disclosure.

Referring now to FIGS. 4 and 5, the plurality of laser beams 210 emitted from the housing 310 of each of the plurality of LIDAR units 300 (only one shown) can be spaced apart from one another by a first angular distance 212. For instance, in some implementations, the first angular distance 212 can be greater than 4 degrees. The first optic 400 can be configured to refract the plurality of laser beams 210 such that the plurality of refracted laser beams 220 exiting the first optic 400 are spaced apart from one another by a second angular distance 222 that is less than the first angular distance 212. In this manner, the resolution of the LIDAR system 200 can be improved. In some implementations, the second angular distance 222 can be less than 2 degrees. In alternative implementations, the second angular distance 222 can be less than 1 degree.

Figure 6:
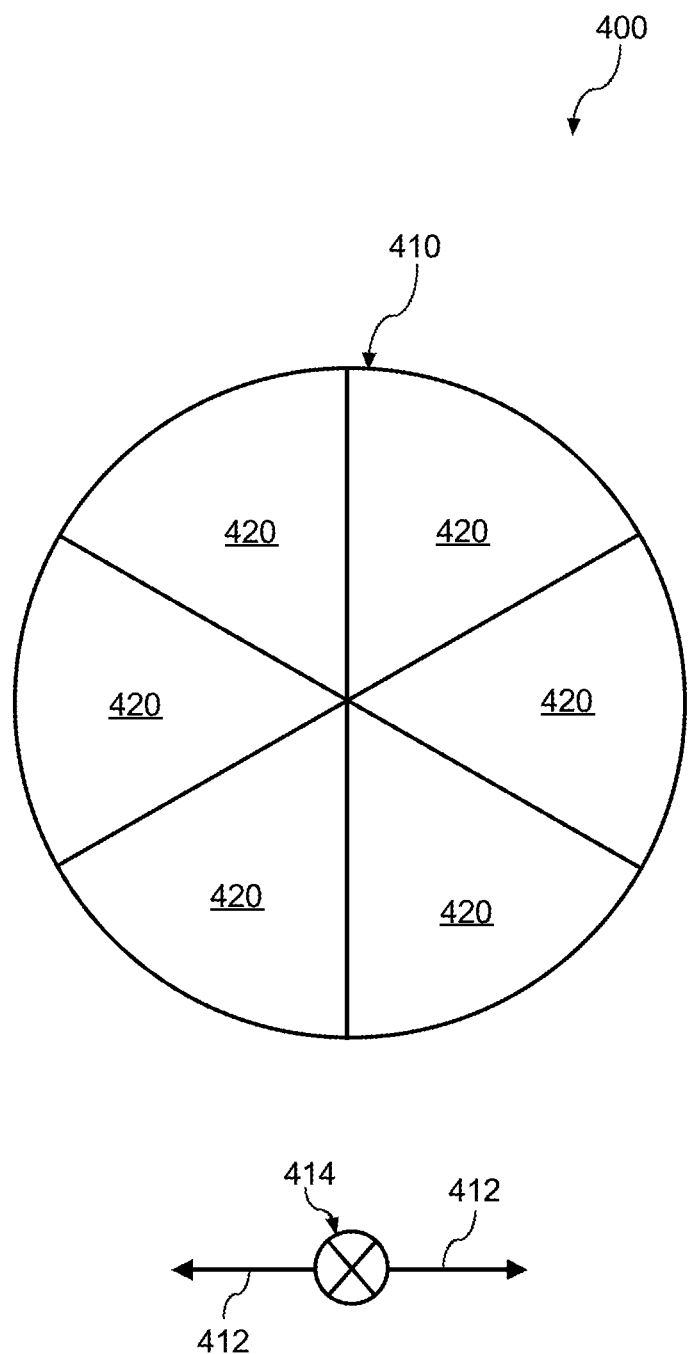
FIG. 6 depicts a top-view of a first optic of a LIDAR system according to example embodiments of the present disclosure.
Figure 7:
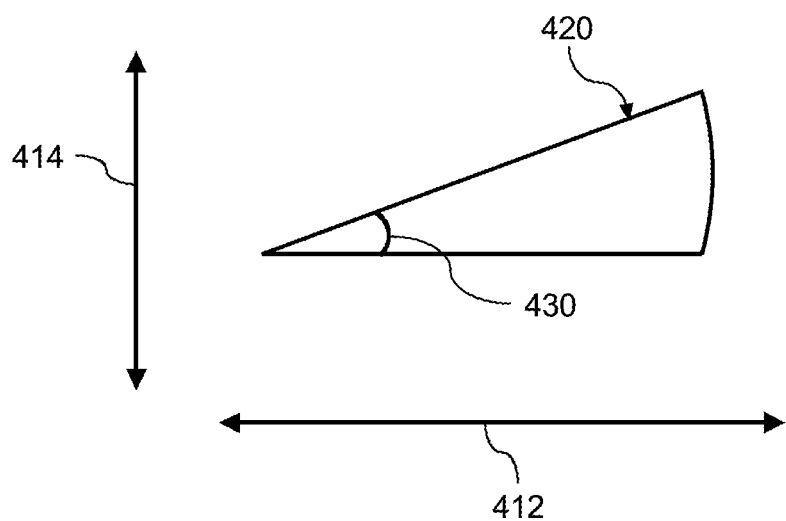
FIG. 7 depicts a cross-sectional view of a wedge of a first optic of a LIDAR system according to example embodiments of the present disclosure.

Referring now to FIGS. 6 and 7, an example embodiment of the first optic 400 is provided according to example embodiments of the present disclosure. As shown, the first optic 400 can include a prism disk 410. The prism disk 410 can define a radial axis 412 and a vertical axis 414. The vertical axis 414 can be substantially perpendicular to the radial axis 412. As shown, the prism disk 410 can include a plurality of wedges 420. For instance, in some implementations, the prism disk 410 can include six wedges 420 (e.g., first wedge, second wedge, third wedge, fourth wedge, fifth wedge, and sixth wedge). In alternative implementations, the prism disk 410 can include more or fewer wedges 420. For instance, in some implementations, the prism disk 410 can include only one wedge 420.

Each of the plurality of wedges 420 of the prism disk 410 can define a different wedge angle 430. For instance, the wedge angle 430 associated with a first wedge of the plurality of wedges 420 can be different than the wedge angle 430 associated with a second wedge of the plurality of wedges 420. In some implementations, the wedge angle 430 for each of the plurality of wedges 420 can range from −5 degrees relative to the radial axis 412 of the prism disk 410 to 5 degrees relative to the radial axis 412 of the prism disk 410.

Figure 8:
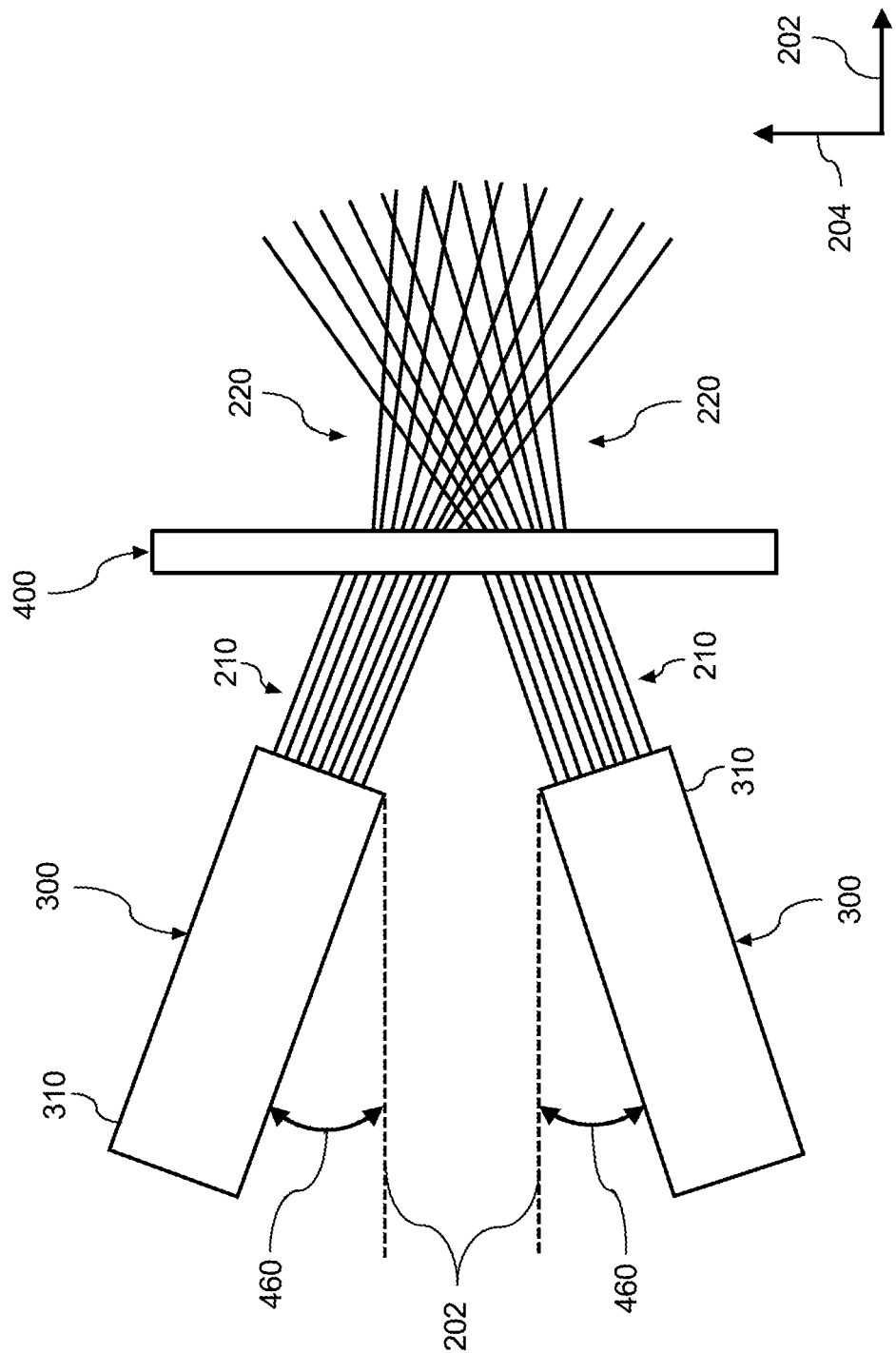
FIG. 8 depicts a side view of a plurality of laser beams exiting each of a first LIDAR unit and a second LIDAR unit pass through a first optic of a LIDAR system according to example embodiments of the present disclosure.
Figure 9:
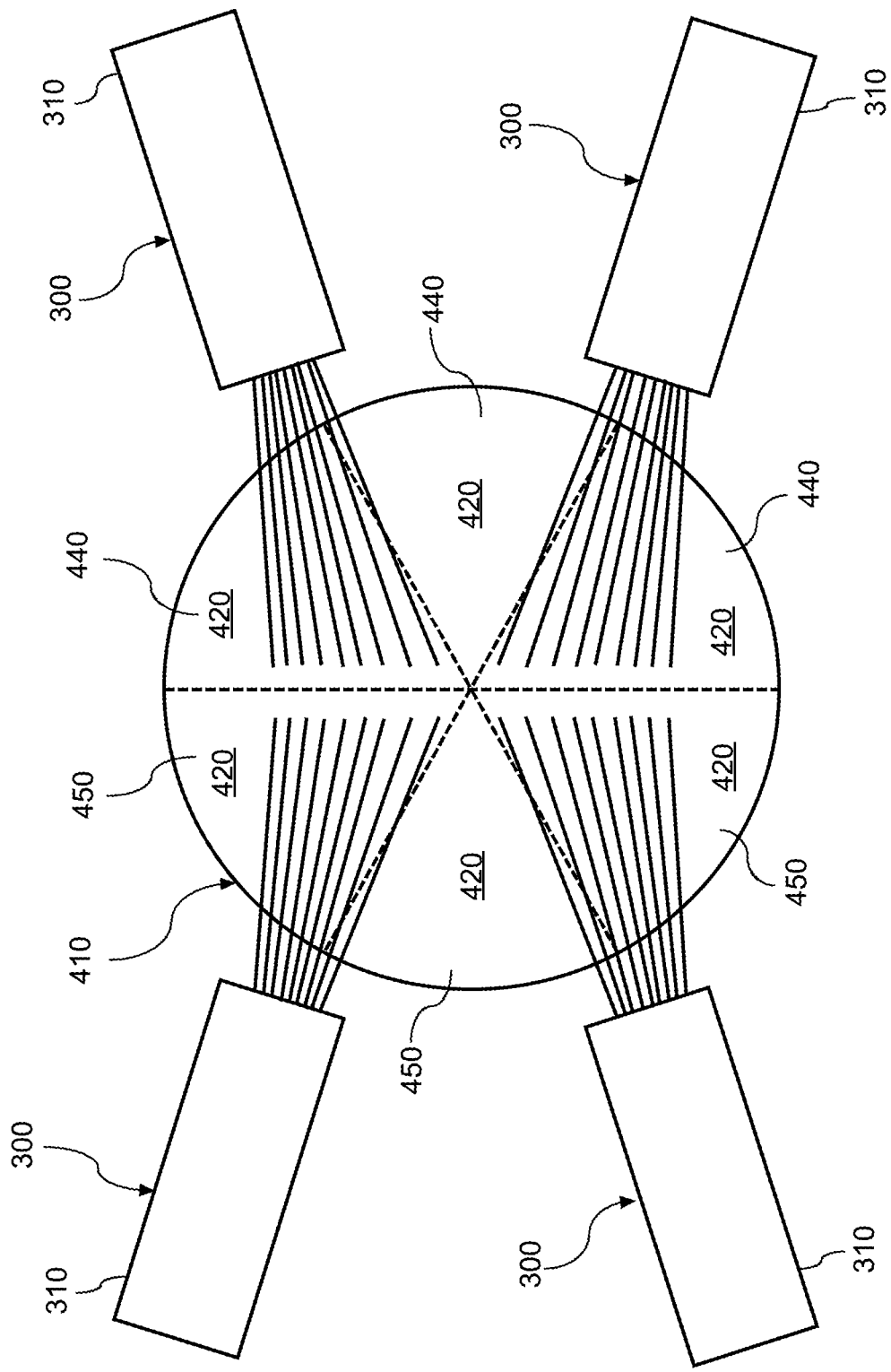
FIG. 9 depicts a front view of FIG. 12 according to example embodiments of the present disclosure.
Figure 10:
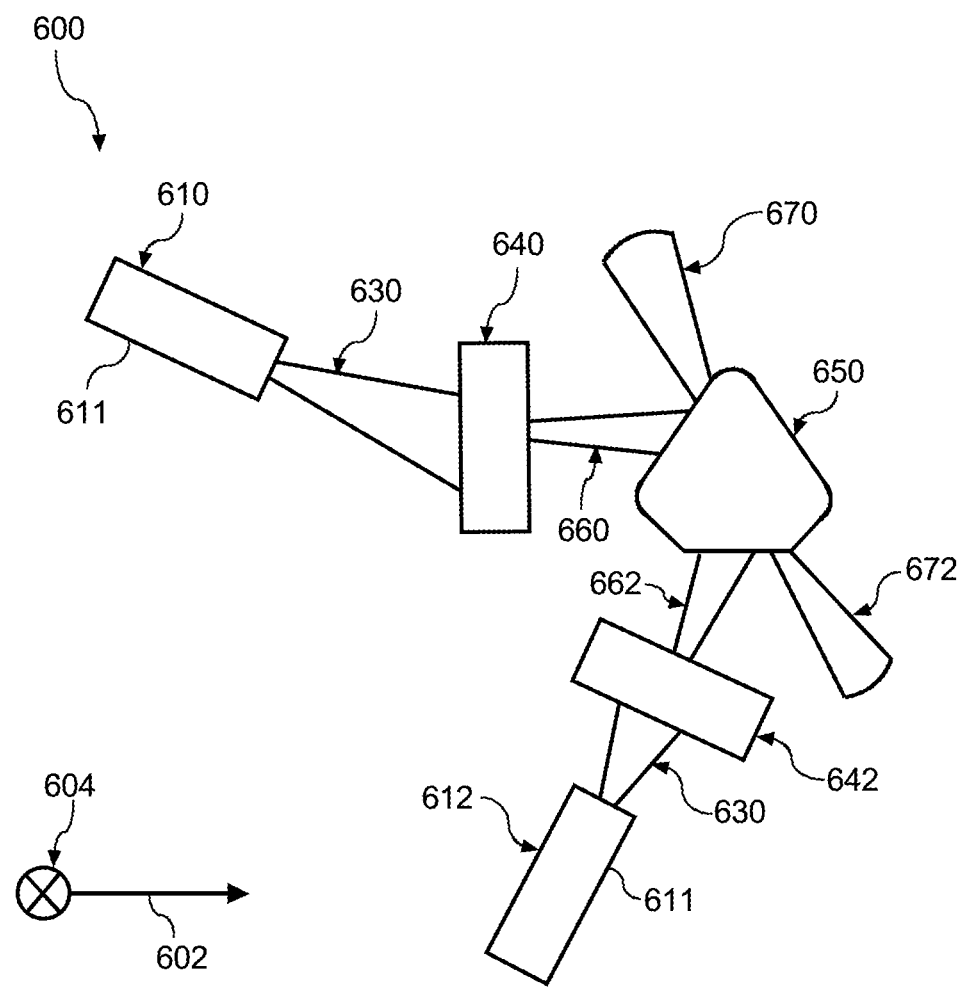
FIG. 10 depicts a LIDAR system according to example embodiments of the present disclosure.
Figure 11:
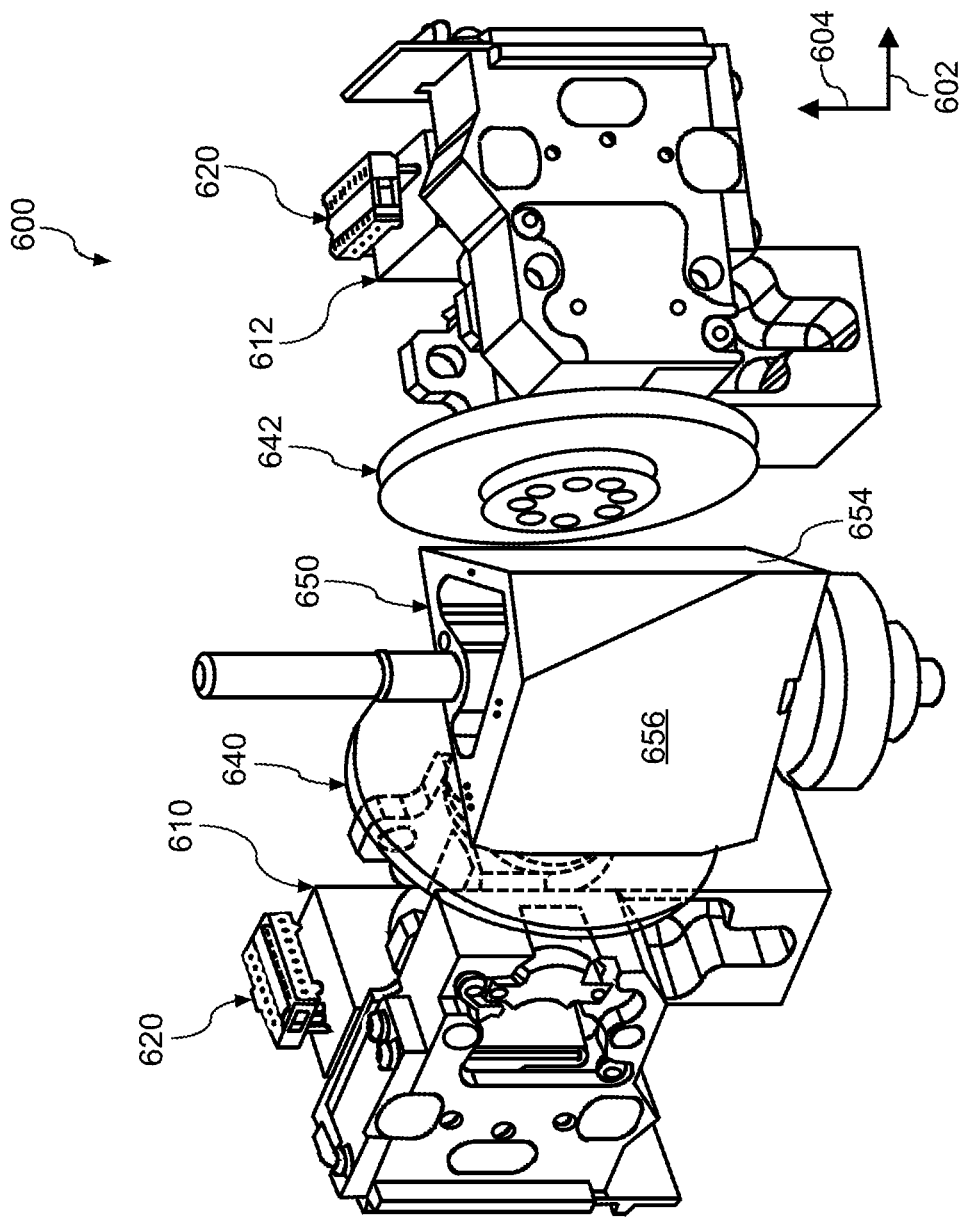
FIG. 11 depicts a perspective view of the LIDAR system of FIG. 10 according to example embodiments of the present disclosure.
Figure 12:
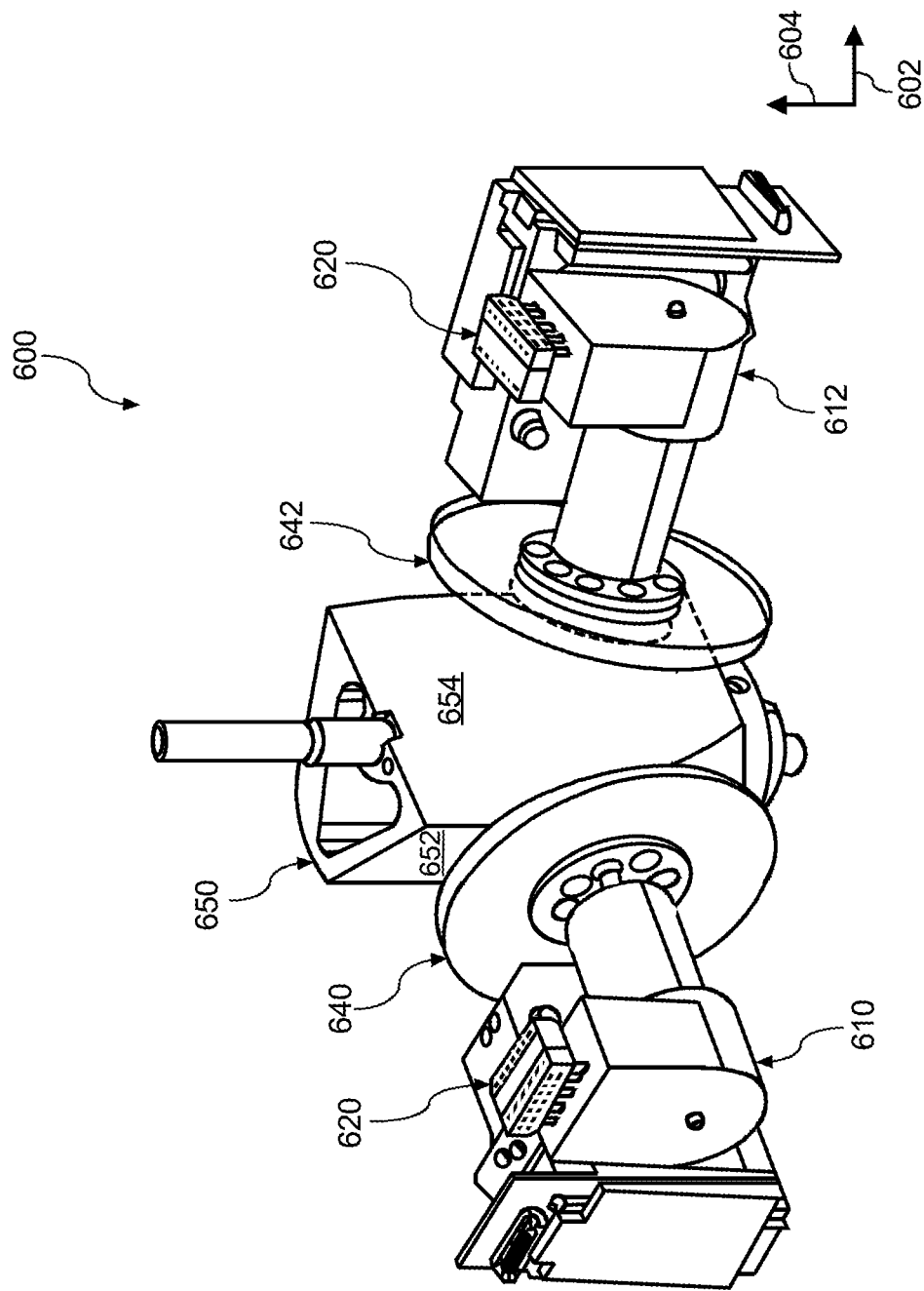
FIG. 12 depicts another perspective view of the LIDAR system of FIG. 10 according to example embodiments of the present disclosure.
Figure 13:
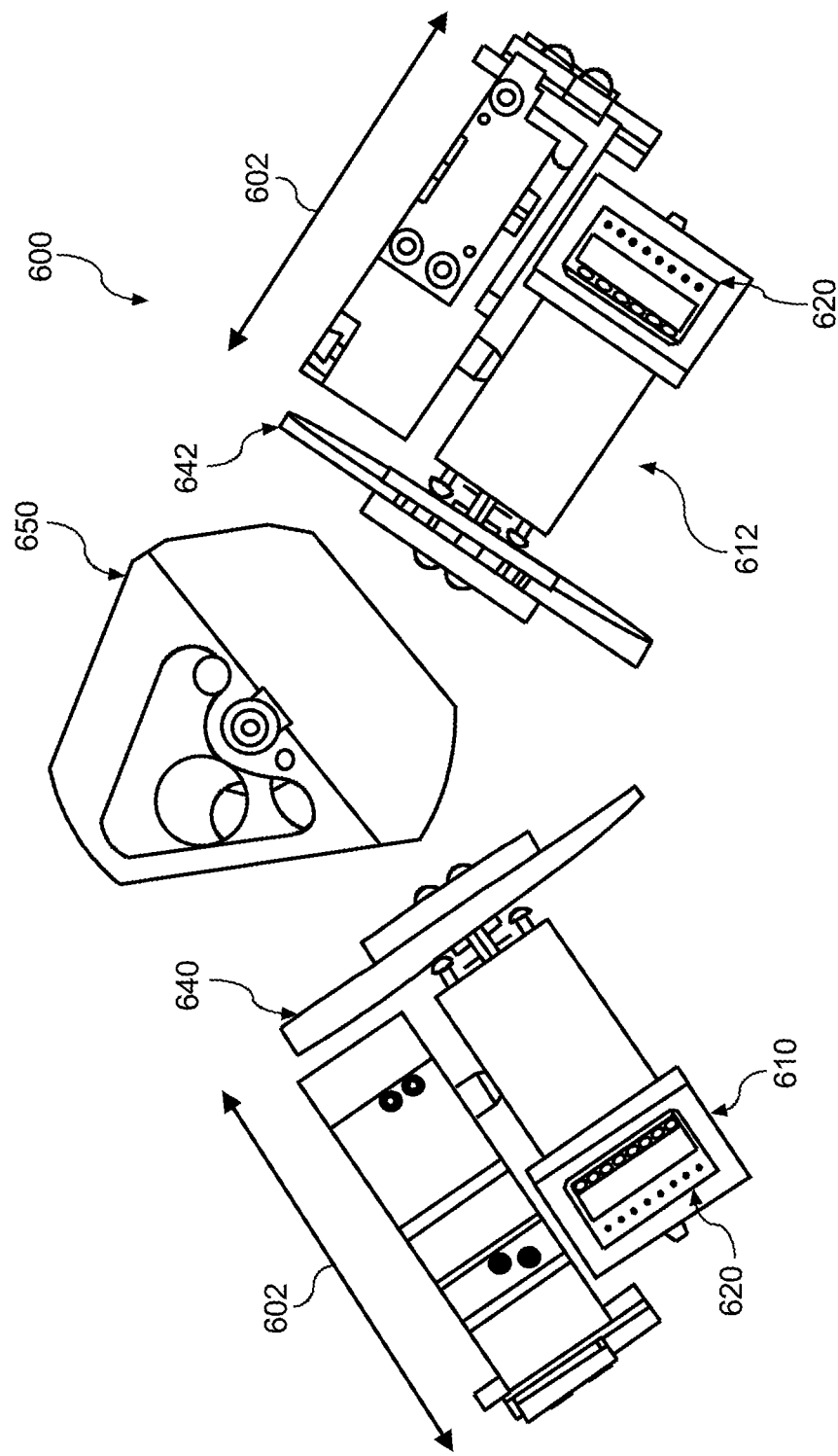
FIG. 13 depicts a top view of the LIDAR system of FIG. 10 according to example embodiments of the present disclosure.

Referring now to FIGS. 8 and 9, the plurality of laser beams 210 exiting the housing 310 of a first LIDAR unit of the plurality of LIDAR units 300 and the plurality of laser beams 210 exiting the housing 310 of a second LIDAR unit of the plurality of LIDAR units 300 can pass through a first portion 440 of the prism disk 410. Conversely, the plurality of laser beams 210 exiting the housing 310 of a third LIDAR unit of the plurality of LIDAR units 300 and the plurality of laser beams 210 exiting the housing 310 of a fourth LIDAR unit of the plurality of LIDAR units 300 can pass through a second portion 450 of the prism disk 410.

As shown, the second portion 450 of the prism disk 410 can be different than the first portion 440 of the prism disk 410. More specifically, the first portion 440 of the prism disk 410 and the second portion 450 of the prism disk 410 can each include different wedges 420. For instance, in some implementations, the first portion 440 of the prism disk 410 can include a first wedge, a second wedge, and a third wedge. Conversely, the second portion 450 of the prism disk 410 can include a fourth wedge, a fifth wedge, and a sixth wedge. In some implementations, each of the wedges 420 (e.g., first wedge, second wedge, third wedge, fourth wedge, fifth wedge, sixth wedge) can be substantially the same size. In this manner, the first portion 440 of the prism disk 410 and the second portion 450 of the prism disk 410 can be symmetric relative to one another.

In some implementations, the housing 310 of each of the plurality of LIDAR units 300 can be tilted relative to the first axis 202 such that an angle 460 is defined therebetween. In some implementations, the angle 460 can be about 45 degrees. For instance, the housing 310 of a first LIDAR unit and the housing 310 of a second LIDAR unit can each be tilted in a first direction (e.g., upward) relative to the first axis 202. Conversely, the housing 310 of a third LIDAR unit and the housing 310 of a fourth LIDAR unit can each be tilted in a second direction (e.g., downward) relative to the first axis 202.

Referring now to FIGS. 10 through 13, another LIDAR system 600 is provided according to example embodiments of the present disclosure. As shown, the LIDAR system 600 can include a first LIDAR unit 610 and a second LIDAR unit 612. It should be understood that the first LIDAR unit 610 and the second LIDAR unit 612 can be similar to the LIDAR units 300 of the LIDAR system 200 discussed above with reference to FIGS. 2 and 3. For instance, the first LIDAR unit 610 and the second LIDAR unit 612 can each include a housing 611 defining a cavity (not shown). Furthermore, the first LIDAR unit 610 and the second LIDAR unit 612 can each include a plurality of emitters 620 positioned within the cavity. It should be understood that each of the plurality of emitters 620 can be configured to emit a laser beam. In this manner, a plurality of laser beams 630 can be emitted from the housing 611 of the first LIDAR unit 610 and the housing 611 of the second LIDAR unit 612.

As shown, the LIDAR system 600 can include a first prism disk 640 and a second prism disk 642. The first prism disk 640 and the second prism disk 642 can each be rotatable about a first axis 602 at a first rotational speed. In some implementations, the first rotational speed can range from 500 revolutions per minute to 700 revolutions per minute. The first prism disk 640 can be positioned relative to the first LIDAR unit 610 such that the plurality of laser beams 630 exiting the first LIDAR unit 610 pass through the first prism disk 640. Conversely, the second prism disk 642 can be positioned relative to the second LIDAR unit 612 such that the plurality of laser beams 630 emitted from the second LIDAR unit 612 pass through the second prism disk 642.

The LIDAR system 600 can further include a mirror 650. The mirror 650 can be rotatable about a second axis 604 at a second rotational speed that is faster than the first rotational speed. For instance, in some implementations, the second rotational speed can range from 3,300 revolutions per minute to 3,900 revolutions per minute. The second axis 604 can be substantially perpendicular (e.g., less than a 15 degree difference, less than a 10 degree difference, less than a 5 degree difference, less than a 1 degree difference, etc.) to the first axis 602. As shown, the mirror 650 can have a plurality of reflective surfaces (e.g., three reflective surfaces). For instance, in some implementations, the mirror 650 can include a first reflective surface 652, a second reflective surface 654, and a third reflective surface 656. In alternative implementations, the mirror 650 can include more or fewer reflective surfaces.

As shown, a plurality of refracted laser beams 660 exiting the first prism disk 640 can reflect off the mirror 650. More specifically, the plurality of refracted laser beams 660 can reflect off the first reflective surface 652 of the mirror 650 as a plurality of reflected laser beams 670. Additionally, a plurality of refracted laser beams 662 exiting the second prism disk 642 can reflect off the mirror 650. More specifically, the plurality of refracted laser beams 662 exiting the second prism disk 642 can reflect off the second reflective surface 654 of the mirror 640 as a plurality of reflected laser beams 672.

A field of regard of the mirror 650 can be wider than a field of regard of each of the first prism disk 640 and the second prism disk 642. For instance, in some implementations, the field of regard of the mirror 650 can be about 180 degrees, whereas the field of regard of each of the first prism disk 640 and the second prism disk 642 can be about 80 degrees. In this manner, the mirror 650 can widen the field of regard of the LIDAR system 600 such that the LIDAR system 600 can scan a larger area without needing to physically move the first LIDAR unit 610, the second LIDAR unit 612, or both.

Figure 14:
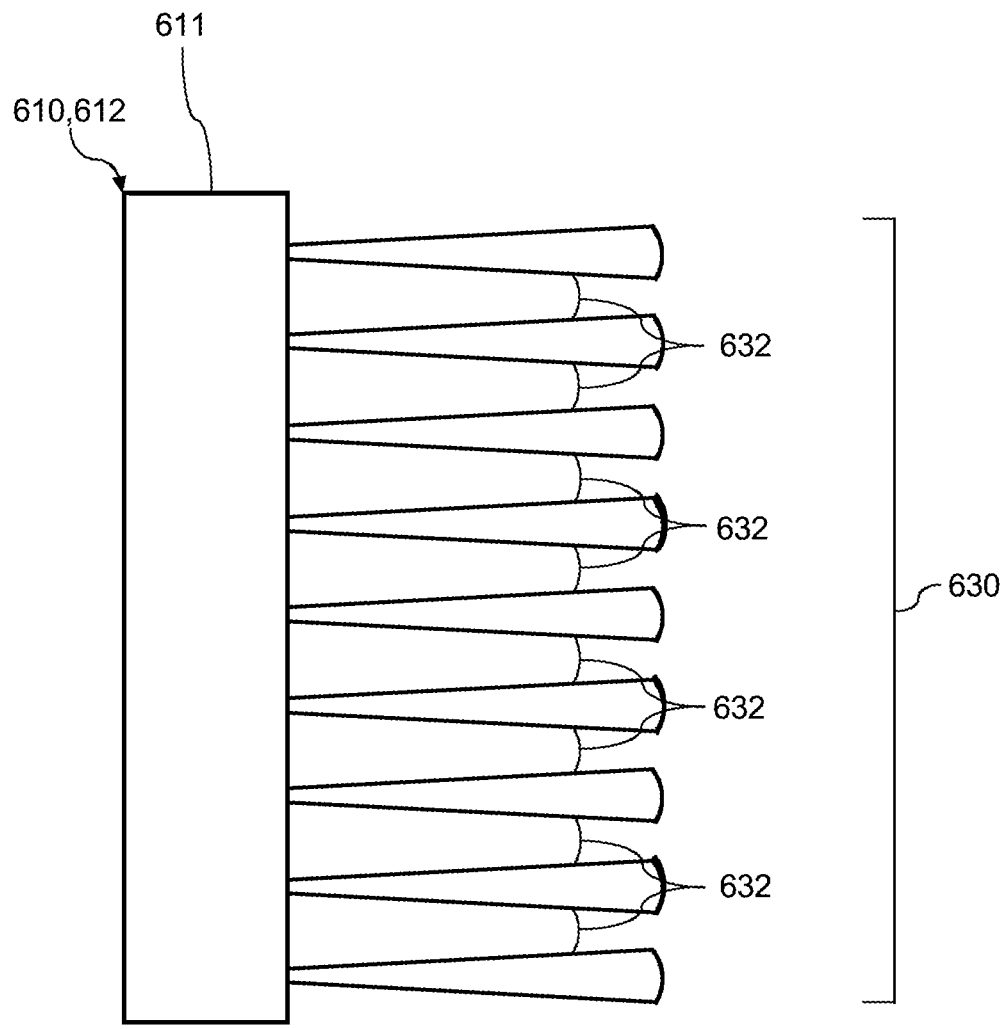
FIG. 14 depicts spacing between a plurality of laser beams exiting a LIDAR unit of the LIDAR system of FIG. 10 according to example embodiments of the present disclosure.
Figure 15:
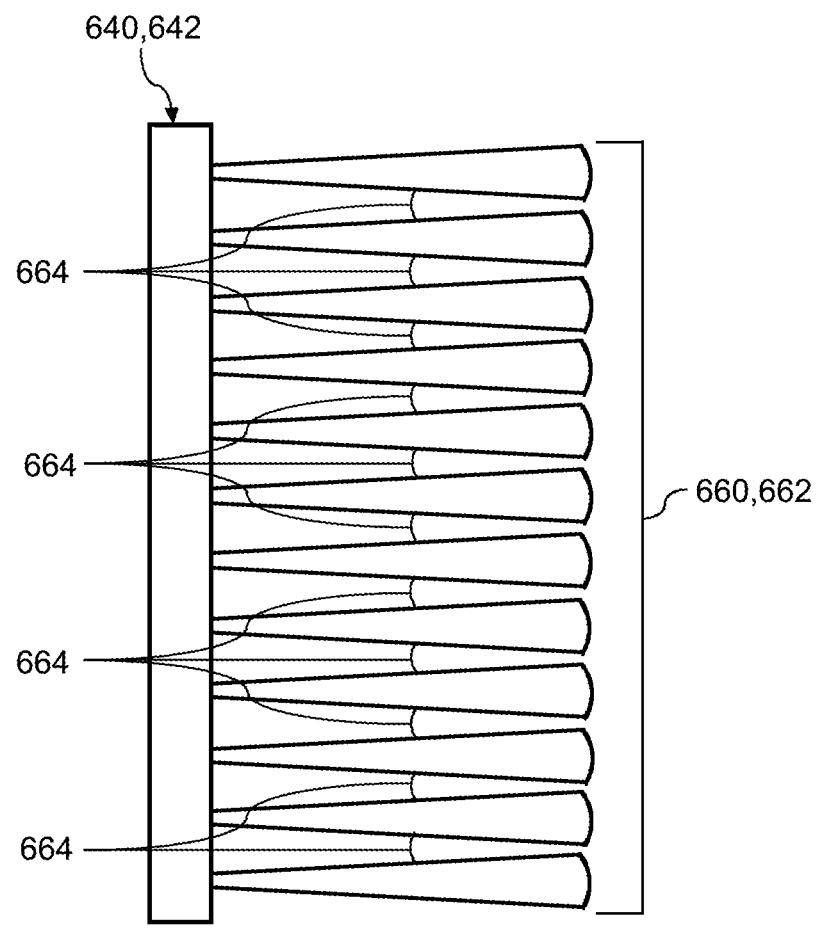
FIG. 15 depicts spacing between a plurality of laser beams exiting a first prism disk or a second prism disk of the LIDAR system of FIG. 10 according to example embodiments of the present disclosure

Referring now to FIGS. 14 and 15, the plurality of laser beams 630 emitted from the housing 611 of the first LIDAR unit 610 and the housing 611 of the second LIDAR unit 612 can be spaced apart from one another by a first angular distance 632. For instance, in some implementations, the first angular distance 632 can be greater than 4 degrees. The first prism disk 640 can be configured to refract the plurality of laser beams 630 emitted from the first LIDAR unit 610 such that the plurality of refracted laser beams 660 are spaced apart from one another by a second angular distance 664 that is less than the first angular distance 632. Additionally, the second prism disk 642 can be configured to refract the plurality of laser beams 630 emitted from the second LIDAR unit 612 such that the plurality of refracted laser beams 662 are spaced apart from one another from by the second angular distance 664. In this manner, the resolution of the LIDAR system 600 can be improved. In some implementations, the second angular distance 664 can be less than 2 degrees. In alternative implementations, the second angular distance 664 can be less than 1 degree.

Figure 16:
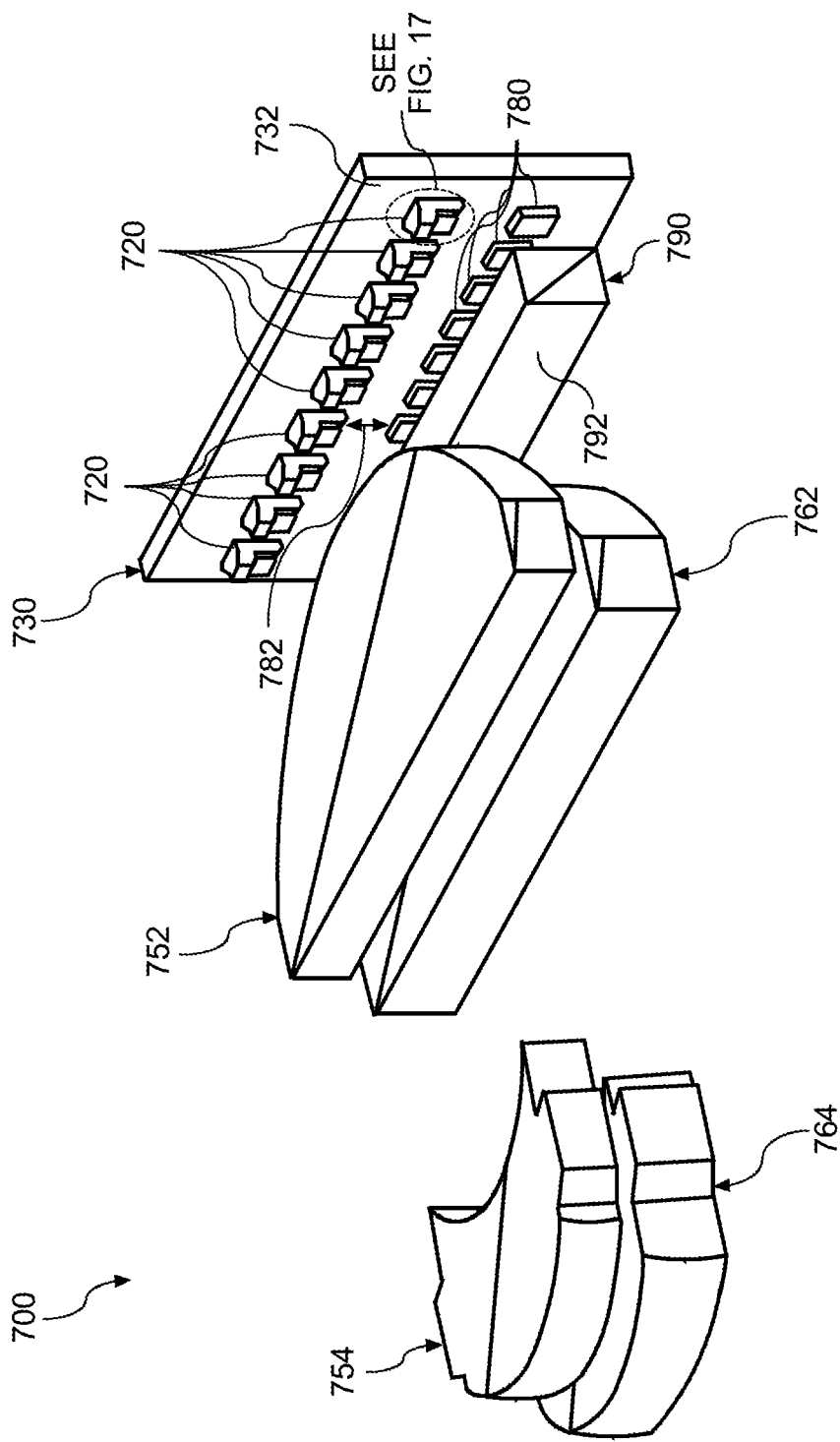
FIG. 16 depicts an exploded view of a LIDAR unit of a LIDAR system according to example embodiments of the present disclosure.
Figure 17:
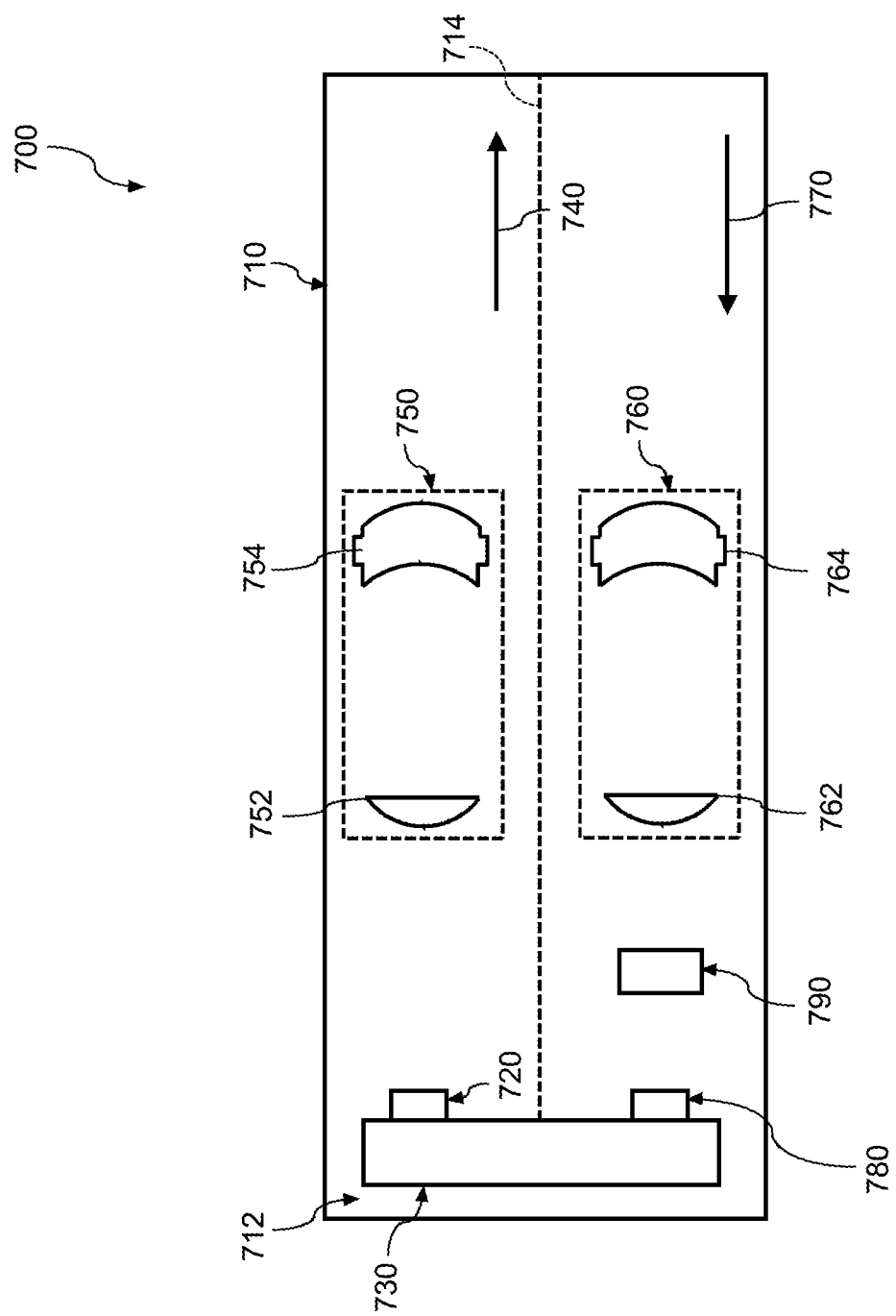
FIG. 17 depicts a cross-sectional view of a LIDAR unit of a LIDAR system according to example embodiments of the present disclosure.

Referring now to FIGS. 16 and 17, a LIDAR unit 700 is provided according to example embodiments of the present disclosure. It should be understood that the LIDAR unit 700 can be used in conjunction with the LIDAR system 200 discussed above with reference to FIGS. 2 and 3 and the LIDAR system 600 discussed above with reference to FIGS. 10-12. As shown, the LIDAR unit 700 can include a housing 710 defining a cavity 712. The LIDAR unit 700 can further include a plurality of emitters 720 disposed on a surface 732 of a circuit board 730 positioned within the cavity 712. In some implementations, the LIDAR unit 700 can include a total of nine emitters 720. In alternative implementations, the LIDAR unit 700 can include more or fewer emitters 720. Each of the plurality of emitters 720 can be configured to emit a laser beam along a transmit path 740 that is substantially perpendicular (e.g., less than a 15 degree difference, less than a 10 degree difference, less than a 5 degree difference, less than a 1 degree difference, etc.) to the surface 732 of the circuit board 730.

The LIDAR unit 700 can include a first telecentric lens assembly 750. The first telecentric lens assembly 750 can be positioned within the cavity 712 of the housing 710 and along the transmit path 740. In this manner, the laser beam emitted from each of the plurality of emitters 720 can pass through the first telecentric lens assembly 750 before exiting the cavity 712. As shown, the LIDAR unit 700 can include a second telecentric lens assembly 760 positioned within the cavity 712 of the housing 710. More specifically, the second telecentric lens assembly 760 can be positioned along a receive path 770 that is substantially perpendicular to the surface 732 of the circuit board 730. In this manner, a plurality of reflected laser beams entering the cavity 712 from an outside environment can pass through the second telecentric lens assembly 760 positioned along the receive path 770.

It should be understood that the receive path 770 along which the second telecentric lens assembly 760 is positioned is different than the transmit path 740 along which the first telecentric lens assembly 750 is positioned. For instance, the receive path 770 can be located at a lower portion of the cavity 712 defined by the housing 710, whereas the transmit path 740 can be located at an upper portion of the cavity 712. Furthermore, in some implementations, the housing 710 of the LIDAR unit 700 can include a partition wall 714 (denoted by dashed line) dividing the cavity 712 into the upper portion and the lower portion.

The first telecentric lens assembly 750 can include multiple lenses. For instance, the first telecentric lens assembly 750 can include at least a first lens 752 and a second lens 754. The first lens 752 can be a field flattening lens. In some implementations, the second lens 754 can be a refractive lens. The first lens 752 (e.g., field flattening lens) can be positioned between the circuit board 730 and the second lens 754. The first telecentric lens assembly 750 can eliminate the need for the plurality of emitters 720 to be disposed on a curved surface. In this manner, the surface 732 of the circuit board 730 on which the plurality of emitters 720 are disposed can be substantially flat (that is, not curved). This can reduce complexity in manufacturing and assembly of the circuit board 730.

The second telecentric lens assembly 760 can include multiple lenses. For instance, the second telecentric lens assembly 760 can include at least a first lens 762 and a second lens 764. The first lens 762 can be a field flattening lens. In some implementations, the second lens 764 can be a refractive lens. The first lens 762 (e.g., field flattening lens) can be positioned between the circuit board 730 and the second lens 764.

In some implementations, the first lens 752 (e.g., field flattening lens) of the first telecentric lens assembly 750 can be thinner than the first lens 762 (e.g., field flattening lens) of the second telecentric lens assembly 760. For instance, in some implementations, the first lens 752 (e.g., telecentric lens) of the first telecentric lens assembly 750 can have a thickness of about 3 millimeters. Conversely, the first lens 762 (e.g., telecentric lens) of the second telecentric lens assembly 760 can have a thickness of about 4 millimeters.

As shown, the LIDAR unit 700 can include a plurality of detectors 780. Each of the plurality of detectors 780 can be configured to detect one or more of the plurality of reflected laser beams entering the cavity 712 from an outside environment. Furthermore, since the LIDAR unit 700 includes the second telecentric lens assembly 760 disposed within the cavity 712 and along the receive path 770, the plurality of detectors 780 need not be disposed on a curved surface. Instead, the plurality of detectors 780 can be disposed on the surface 732 of the circuit board 730. In this manner, the plurality of emitters 720 and the plurality of detectors 780 can be disposed on the same surface 732 of the same circuit board 730.

As shown, each of the plurality of detectors 780 can be spaced apart from a corresponding emitter of the plurality of emitters 720 by a distance 782. For instance, in some implementations, the distance 782 can be about 4 millimeters. It should be understood that the plurality of detectors 780 can include any suitable type of photodiode. For instance, in some implementations, each of the plurality of detectors 780 can include an avalanche photodiode.

In some implementations, the LIDAR unit 700 can include an optical filter 790. It should be understood that the optical filter 790 can include any type of filter. For instance, in some implementations, the optical filter 790 can be a bandpass filter. As shown, the optical filter 790 can be positioned within the cavity 712 and along the receive path 770. More specifically, the optical filter 790 can be positioned between the plurality of detectors 780 and the first lens 762 (e.g., field flattening lens) of the second telecentric lens assembly 760. In this manner, the optical filter 790 can have a narrow acceptance angle, because the plurality of reflected laser beams exiting the first lens 762 (e.g., field flattening lens) of the second telecentric lens assembly 760 can be substantially perpendicular (e.g., less than a 15 degree difference, less than a 10 degree difference, less than a 5 degree difference, less than a 1 degree difference, etc.) to a surface 692 of the optical filter 690. In some implementations, the acceptance angle of the optical filter 690 can be about 2 degrees.

Figure 18:
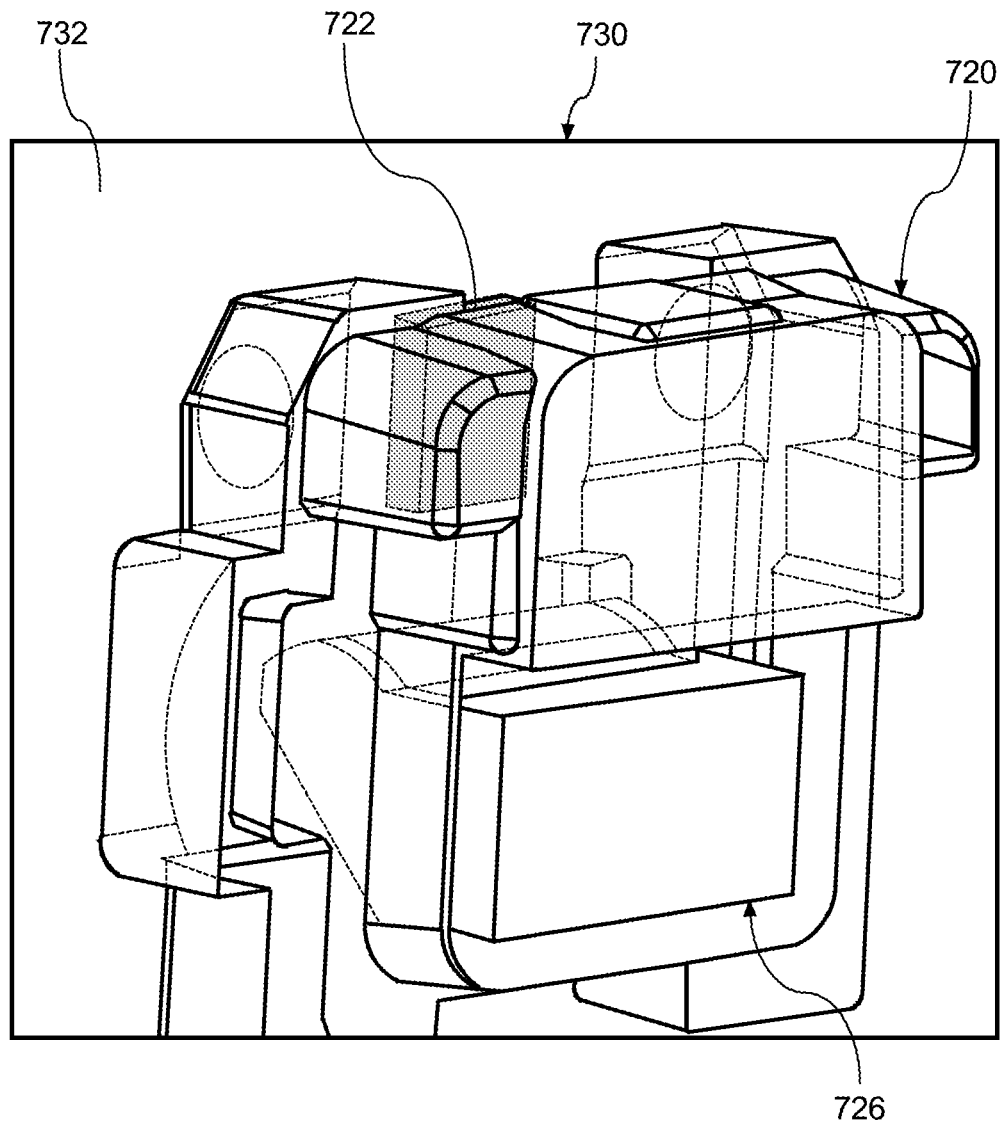
FIG. 18 depicts an emitter of the LIDAR unit in FIG. 10 according to example embodiments of the present disclosure.
Figure 19:
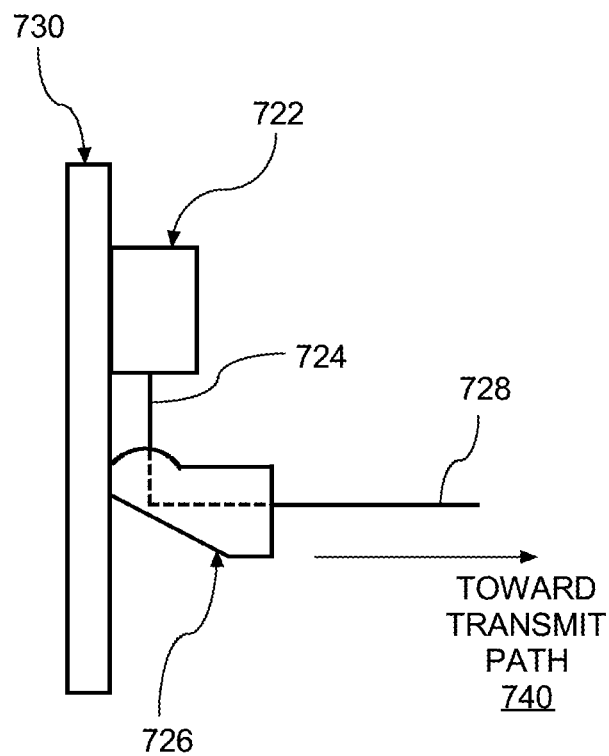
FIG. 19 depicts a laser diode of the emitter in FIG. 12 emitting a laser beam according to example embodiments of the present disclosure.

Referring briefly now to FIGS. 18 and 19, each of the plurality of emitters 720 can include a laser diode 722 configured to emit a laser beam 724. In some implementations, the laser diode 722 can be configured to emit the laser beam 724 such that the laser beam 724 is substantially parallel (e.g., less than a 15 degree difference, less than a 10 degree difference, less than a 5 degree difference, less than a 1 degree difference, etc.) to the surface 732 of the circuit board 730. In such implementations, each of the plurality of emitters 720 can include a collimation lens 726. The collimation lens 726 can be positioned relative to the laser diode 722 such that the laser beam 724 reflects off a surface of the collimation lens 726. More specifically, the laser beam 724 can reflect off the surface of the collimation lens 726 such that the reflected laser beam 728 is substantially perpendicular to the circuit board 730. In this manner, the reflected laser beam 728 can be directed along the transmit path 740.

Figure 20:
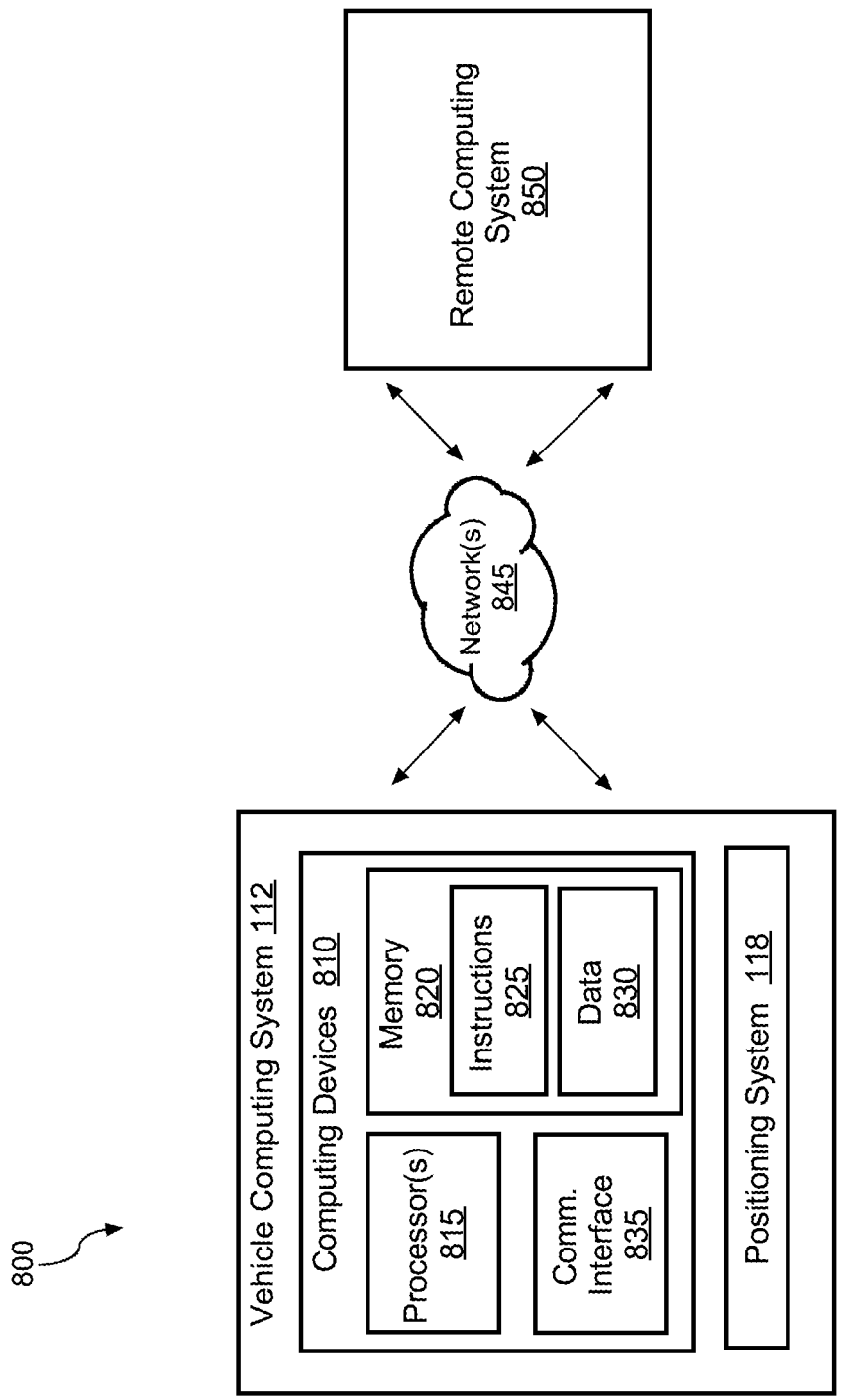
FIG. 20 depicts an example computing system according to example embodiments of the present disclosure.

FIG. 20 depicts example system components of an example computing system 800 according to example embodiments of the present disclosure. The example computing system 800 can include the vehicle computing system 112 and one or more remote computing system(s) 850 that are communicatively coupled to the vehicle computing system 112 over one or more network(s) 845. The computing system 800 can include one or more computing device(s) 810. The computing device(s) 810 of the vehicle computing system 112 can include processor(s) 815 and a memory 820. The one or more processors 815 can be any suitable processing device (e.g., a processor core, a microprocessor, an ASIC, a FPGA, a controller, a microcontroller, etc.) and can be one processor or a plurality of processors that are operatively connected. The memory 820 can include one or more non-transitory computer-readable storage media, such as RAM, ROM, EEPROM, EPROM, one or more memory devices, flash memory devices, etc., and combinations thereof.

The memory 820 can store information that can be accessed by the one or more processors 815. For instance, the memory 820 (e.g., one or more non-transitory computer-readable storage mediums, memory devices) can include computer-readable instructions 825 that can be executed by the one or more processors 815. The computer-readable instructions 825 can be software written in any suitable programming language or can be implemented in hardware. Additionally, or alternatively, the computer-readable instructions 825 can be executed in logically and/or virtually separate threads on processor(s) 815.

For example, the memory 820 can store the computer-readable instructions 825 that, when executed by the one or more processors 815, cause the one or more processors 815 to perform operations such as any of the operations and functions for which the computing systems are configured, as described herein.

The memory 820 can store data 830 that can be obtained, received, accessed, written, manipulated, created, and/or stored. The data 830 can include, for instance, sensor data obtained via the LIDAR system 200, 600 (shown in FIGS. 2 and 10, respectively), and/or other data/information described herein. In some implementations, the computing device(s) 810 can obtain from and/or store data in one or more memory device(s) that are remote from the computing system 800, such as one or more memory devices of the remote computing system 850.

The computing device(s) 810 can also include a communication interface 835 used to communicate with one or more other system(s) (e.g., remote computing system 850). The communication interface 835 can include any circuits, components, software, etc. for communicating via one or more networks (e.g., 845). In some implementations, the communication interface 835 can include for example, one or more of a communications controller, receiver, transceiver, transmitter, port, conductors, software and/or hardware for communicating data/information.

The network(s) 845 can be any type of network or combination of networks that allows for communication between devices. In some implementations, the network(s) 845 can include one or more of a local area network, wide area network, the Internet, secure network, cellular network, mesh network, peer-to-peer communication link and/or some combination thereof and can include any number of wired or wireless links. Communication over the network(s) 845 can be accomplished, for instance, via a network interface using any type of protocol, protection scheme, encoding, format, packaging, etc.

FIG. 20 illustrates one example computing system 800 that can be used to implement the present disclosure. Other computing systems can be used as well without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure.

Figure 21:
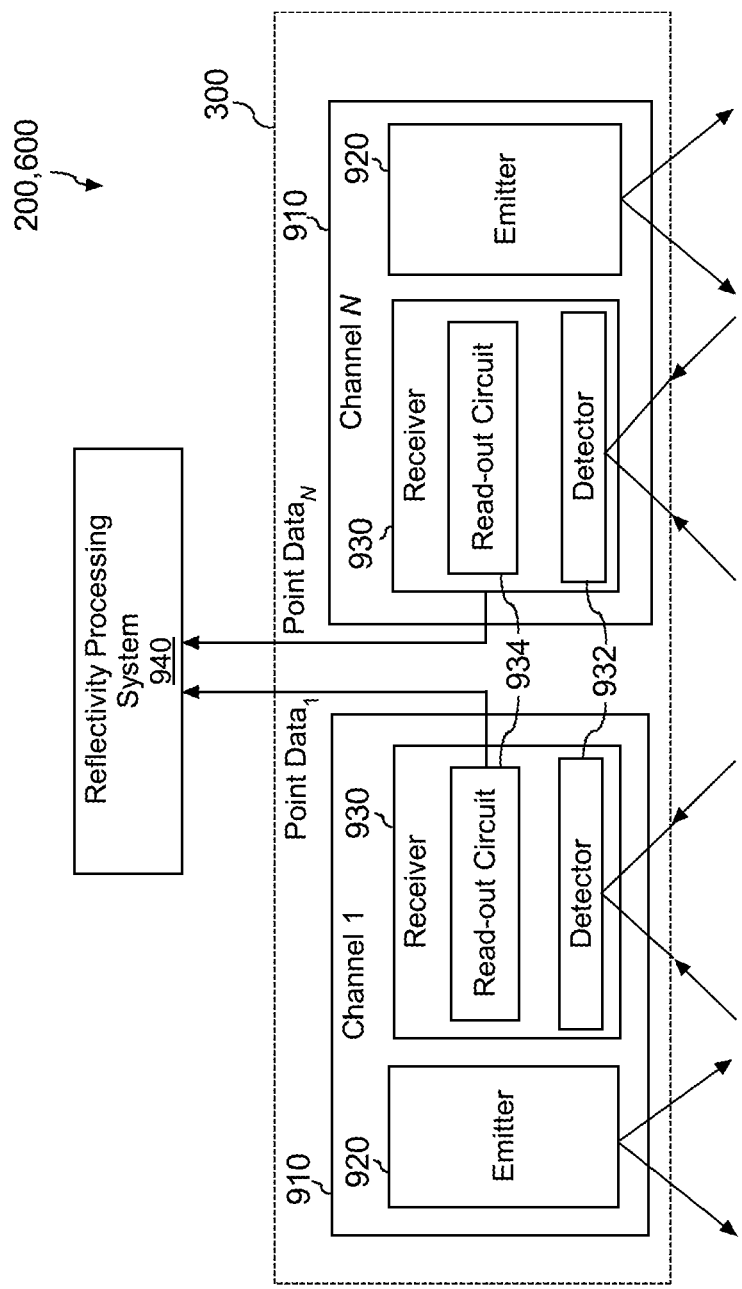
FIG. 21 depicts a block diagram of components of LIDAR system according to example embodiments of the present disclosure.

Referring now to FIG. 21, a block diagram of the LIDAR system 200, 600 is provided according to example embodiments of the present disclosure. It should be understood that the LIDAR system 200, 600 can be included as part of the sensors 114 discussed above with reference to FIG. 1. As shown, the LIDAR system 200, 600 can include multiple channels 910; specifically, channels 1-N are illustrated. It should be understood that channels 1-N can be included in a single LIDAR unit 300 or may be spread across multiple LIDAR units 300. Each channel 910 can output point data that provides a single point of ranging information. The point data output by each of the channels 910 (e.g., point $data_{1-N}$) can be combined to create a point cloud that corresponds to a three-dimensional representation of the surrounding environment.

As shown, each channel 910 can include an emitter 920 paired with a receiver 930. The emitter 920 emits a laser signal into the environment that is reflected off the surrounding environment and returned back to a detector 832 (e.g., an optical detector) of the receiver 930. Each emitter 920 can have an adjustable power level that controls an intensity of the emitted laser signal. The adjustable power level allows the emitter 920 to be capable of emitting the laser signal at one of multiple different power levels (e.g., intensities).

The detector 932 can provide the return signal to a read-out circuit 934. The read-out circuit 934 can, in turn, output the point data based on the return signal. The point data can indicate a distance the LIDAR system 200, 600 is from a detected object (e.g., road, pedestrian, vehicle, etc.) that is determined by the read-out circuit 934 by measuring time-of-flight (ToF), which is the time elapsed time between the emitter 920 emitting the laser signal (e.g., laser beam) and the receiver 930 detecting the return signal (e.g., reflected laser beam).

The point data further includes an intensity value corresponding to each return signal. The intensity value indicates a measure of intensity of the return signal determined by the read-out circuit 934. As noted above, the intensity of the return signal provides information about the surface reflecting the signal and can be used by the autonomy computing system 120 (FIG. 1) for localization, perception, prediction, and/or motion planning. The intensity of the return signals depends on a number of factors, such as the distance of the LIDAR system 200, 600 to the detected object, the angle of incidence at which the emitter 920 emits the laser signal, temperature of the surrounding environment, the alignment of the emitter 920 and the receiver 930, and the reflectivity of the detected surface.

As shown, a reflectivity processing system 940 receives the point data from the LIDAR system 200, 600 and processes the point data to classify specular reflectivity characteristics of objects. The reflectivity processing system 940 classifies the specular reflectivity characteristics of objects based on a comparison of reflectivity values derived from intensity values of return signals. In some embodiments, the LIDAR system 200, 600 can be calibrated to produce the reflectivity values. For example, the read-out circuit 934 or another component of the LIDAR system 200, 600 can be configured to normalize the intensity values to produce the reflectivity values. In these embodiments, the reflectivity values may be included in the point data received by the reflectivity processing system 940 from the LIDAR system 200, 600. In other embodiments, the reflectivity processing system 940 may generate the reflectivity values based on intensity return values included in the point data received from the LIDAR system 200, 600.

Regardless of which component is responsible for generating the reflectivity values, the process for doing so may, in some embodiments, include using a linear model to compute one or more calibration multipliers and one or more bias values to be applied to return intensity values. Depending on the embodiment, a calibration multiplier and bias value may be computed for and applied to each channel of the LIDAR system 200, 600 at each power level. The linear model assumes a uniform diffuse reflectivity for all surfaces and describes an expected intensity value as a function of a raw intensity variable, a calibration multiplier variable, and/or a bias variable. The computing of the calibration multiplier and bias value for each channel/power level combination includes determining a median intensity value based on the raw intensity values output by the channel at the power level and using the median intensity value as the expected intensity value in the linear model while optimizing values for the calibration multiplier variable and bias variable. As an example, the calibration multiplier and bias value may be computed by solving the linear model using an Iterated Re-weighted Least Squares approach.

The calibration multiplier and bias value computed for each channel 910 at each power level can be assigned to the corresponding channel/power level combination. In this way, each power level of each channel of the LIDAR system 200, 600 can have an independently assigned calibration multiplier and bias value from which reflectivity values may be derived. Once assigned, the calibration multiplier and bias value of each channel/power level combination can be used at run-time to determine reflectivity values from subsequent intensity values produced by the corresponding channel at the corresponding power level during operation of an autonomous or semi-autonomous vehicle. More specifically, reflectivity values can be determined from the linear model by using the value of the calibration multiplier and the bias value for the calibration multiplier variable and bias variable, respectively. In this manner, the intensity values can be normalized to be more aligned with the reflectivity of a surface by taking into account factors such as the distance of the LIDAR system 200, 600 to the detected surface, the angle of incidence at which the emitter 920 emits the laser signal, temperature of the surrounding environment, and/or the alignment of the emitter 920 and the receiver 930.

Figure 22:
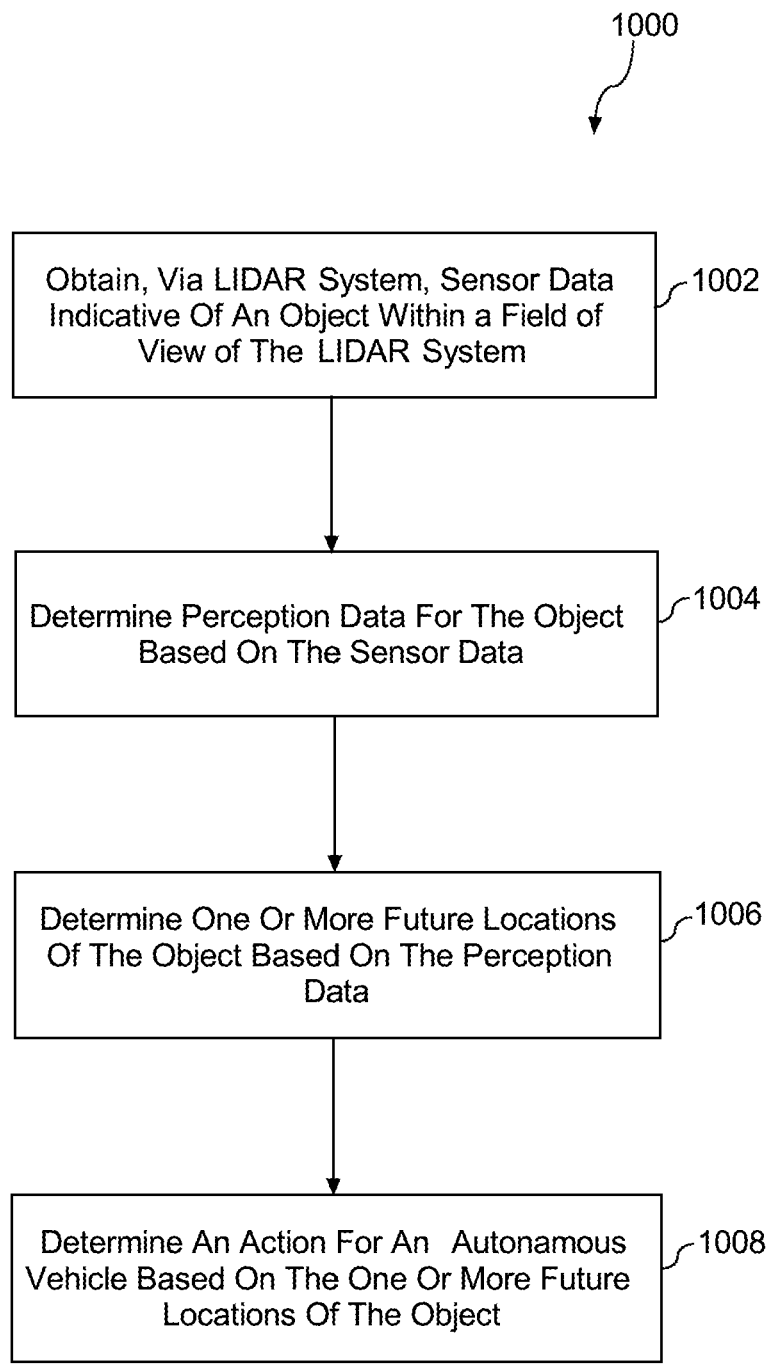
FIG. 22 depicts a flow diagram of a method of controlling operation of an autonomous vehicle according to sensor data obtained from a LIDAR system according to example embodiments of the present disclosure.

Referring now to FIG. 22, a flowchart diagram of an example method 1000 of controlling operation of an autonomous vehicle having a LIAR system is provided according to example embodiments of the present disclosure. One or more portion(s) of the method 1000 can be implemented by a computing system that includes one or more computing devices such as, for example, the computing systems described with reference to the other figures (e.g., the vehicle computing system 112, the operations computing system 104, the one or more remote computing devices 106, etc.). Each respective portion of the method 1000 can be performed by any (or any combination) of one or more computing devices. Moreover, one or more portion(s) of the method 1000 can be implemented as an algorithm on the hardware components of the device(s) described herein to, for example, control operation of the autonomous vehicle according to data obtained from the LIDAR system.

FIG. 22 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 19 is described with reference to elements/terms described with respect to other systems and figures for exemplary illustrated purposes and is not meant to be limiting. One or more portions of method 900 can be performed additionally, or alternatively, by other systems.

At (1002), the method 1000 can include obtaining, via the LIDAR system, sensor data indicative of an object within a field of view of the LIDAR system. As described herein, wherein the LIDAR system can include one or more LIDAR units including a housing defining a cavity and one or more emitters disposed within the cavity. Each of the one or more emitters can be configured to emit one or more laser beams. The LIDAR system can include a prism disk rotatable about a first axis at a first rotational speed. The prism disk can be configured to refract the one or more laser beams emitted from the one or more emitters. The LIDAR system can include a mirror rotatable about a second axis at a second rotational speed. The mirror can be positioned relative to the prism disk such that each of the one or more laser beams exiting the prism disk reflect off of the mirror, as described herein.

Additionally, or alternatively, the LIDAR system can include a LIDAR unit. The LIDAR unit can include: a housing defining a cavity, one or more emitters positioned within the cavity and configured to emit one or more laser beams along a transmit path, a first telecentric lens along the transmit path, a second telecentric lens along a receive path, and one or more detectors configured to detect one or more reflected laser beams entering the cavity, as described herein.

At (1004), the method 1000 can include determining perception data for the object based, at least in part, on the sensor data obtained at (902). The perception data can describe, for example, an estimate of the object's current and/or past: location and/or position; speed; velocity; acceleration; heading; orientation; size/footprint (e.g., as represented by a bounding shape); class (e.g., pedestrian class vs. vehicle class vs. bicycle class); and/or other state information.

At (1006), the method 1000 can include determining one or more future locations of the object based, at least in part, on the perception data for the object. For example, the autonomous vehicle can generate a trajectory (e.g., including one or more waypoints) that is indicative of a predicted future motion of the object, given the object's heading, velocity, type, etc. over current/previous timestep(s).

At (1008), the method 1000 can include determining an action for the autonomous vehicle based at least in part on the one or more future locations of the object. For example, the autonomous vehicle can generate a motion plan that includes a vehicle trajectory by which the vehicle can travel to avoid interfering/colliding with the object. In another example, the autonomous vehicle can determine that the object is a user that intends to enter the autonomous vehicle (e.g., for a human transportation service) and/or that intends place an item in the autonomous vehicle (e.g., for a courier/delivery service). The autonomous vehicle can unlock a door, trunk, etc. to allow the user to enter and/or place an item within the vehicle. The autonomous vehicle can communicate one or more control signals (e.g., to a motion control system, door control system, etc.) to initiate the determined actions.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A light detection and ranging (LIDAR) system for a vehicle, comprising:
a plurality of emitters disposed on a first portion of a circuit board, the plurality of emitters respectively configured to emit a laser beam;
a first optical element assembly configured to receive the laser beam, wherein the first optical element assembly comprises a first field flattening optical element;
a second optical element assembly configured to receive a plurality of reflected laser beams, wherein the second optical element assembly comprises a second field flattening optical element, the first field flattening optical element being thinner than the second field flattening optical element; and
a plurality of detectors disposed on a second portion of the circuit board, spaced apart from the plurality of emitters in a first direction, the plurality of detectors respectively configured to receive the plurality of reflected laser beams through the second optical element assembly,
wherein at least one of the plurality of emitters comprises:
a laser diode configured to emit the laser beam parallel to the circuit board in the first direction; and
a collimation optical element configured to reflect the laser beam towards the first optical element assembly.

2. The LIDAR system of claim 1, wherein:
the first optical element assembly comprises at least one other first optical element, the first field flattening optical element being positioned between the plurality of emitters and the at least one other first optical element; and
the second optical element assembly comprises at least one other second optical element, the second field flattening optical element being positioned between the plurality of detectors and the at least one other second optical element.

3. The LIDAR system of claim 2, further comprising:
a housing defining a cavity; and
an optical filter disposed within the cavity between the plurality of detectors and the second field flattening optical element.

4. The LIDAR system of claim 3, wherein the optical filter comprises a bandpass filter.

5. The LIDAR system of claim 3, wherein the plurality of reflected laser beams exits the second field flattening optical element in a direction substantially perpendicular to a surface of the optical filter.

6. The LIDAR system of claim 5, wherein an acceptance angle of the optical filter is between 1.6 degrees and 2.4 degrees.

7. The LIDAR system of claim 1, wherein the plurality of detectors are spaced apart from the plurality of emitters in the first direction by a distance corresponding to a thickness of the second optical element assembly.

8. The LIDAR system of claim 1, further comprising a housing defining a cavity, wherein the circuit board is positioned in the cavity and the housing includes a partition wall dividing the cavity into a first portion in which the first optical element assembly is positioned and a second portion in which the second optical element assembly is positioned.

9. The LIDAR system of claim 1, wherein the first optical element assembly is different from the second optical element assembly.

10. The LIDAR system of claim 1, wherein at least one of the plurality of detectors comprises an avalanche photodiode.

11. The LIDAR system of claim 1, wherein:
the first field flattening optical element has a thickness of about 3 millimeters; and
the second field flattening optical element has a thickness of about 4 millimeters.

12. An autonomous vehicle, comprising:
a light detection and ranging (LIDAR) system comprising:
a plurality of emitters disposed on a first portion of a circuit board, the plurality of emitters respectively configured to emit a laser beam;
a first optical element assembly configured to receive the laser beam, wherein the first optical element assembly comprises a first field flattening optical element;
a second optical element assembly configured to receive a plurality of reflected laser beams, wherein the second optical element assembly comprises a second field flattening optical element, the first field flattening optical element being thinner than the second field flattening optical element; and
a plurality of detectors disposed on a second portion of the circuit board, spaced apart from the plurality of emitters in a first direction, the plurality of detectors respectively configured to receive the plurality of reflected laser beams by way of the second optical element assembly,
wherein at least one of the plurality of emitters comprises:
a laser diode configured to emit the laser beam parallel to the circuit board in the first direction; and
a collimation optical element configured to reflect the laser beam towards the first optical element assembly; and
one or more processors configured to control an operation of the autonomous vehicle based on information associated with the plurality of reflected laser beams.

13. The autonomous vehicle of claim 12, wherein:
the first optical element assembly comprises at least one other first optical element, the first field flattening optical element being positioned between the plurality of emitters and the at least one other first optical element, and
the second optical element assembly comprises at least one other second optical element, the second field flattening optical element being positioned between the plurality of detectors and the at least one other second optical element.

14. The autonomous vehicle of claim 13, wherein the LIDAR system further comprises:

a housing defining a cavity; and an optical filter disposed within the cavity between the plurality of detectors and the second field flattening optical element.

15. The autonomous vehicle of claim 12, wherein a surface of the circuit board on which the plurality of emitters are disposed is substantially flat.

16. The autonomous vehicle of claim 12, wherein at least one of the plurality of detectors comprises an avalanche photodiode.

17. The autonomous vehicle of claim 12, wherein:

the LIDAR system further comprises a housing defining a cavity, the circuit board is positioned in the cavity, and the housing includes a partition wall dividing the cavity into a first portion in which the first optical element assembly is positioned and a second portion in which the second optical element assembly is positioned.

18. An autonomous vehicle control system, comprising:

a light detection and ranging (LIDAR) system comprising:

a plurality of emitters disposed on a first portion of a circuit board, the plurality of emitters respectively configured to emit a laser beam;

a first optical element assembly configured to receive the laser beam, wherein the first optical element assembly comprises a first field flattening optical element;

a second optical element assembly configured to receive a plurality of reflected laser beams, wherein the second optical element assembly comprises a second field flattening optical element, the first field flattening optical element being thinner than the second field flattening optical element; and a plurality of detectors disposed on a second portion of the circuit board, spaced apart from the plurality of emitters in a first direction, the plurality of detectors respectively configured to receive the plurality of reflected laser beams by way of the second optical element assembly, wherein at least one of the plurality of emitters comprises:

a laser diode configured to emit the laser beam parallel to the circuit board in the first direction; and a collimation optical element configured to reflect the laser beam towards the first optical element assembly; and one or more processors configured to control an operation of a vehicle system based on information associated with the plurality of reflected laser beams.

* * * * *